United States Patent
Raghavan et al.

(10) Patent No.: US 12,519,530 B2
(45) Date of Patent: Jan. 6, 2026

(54) INDICATING BEAM PROPERTY CHANGES ACROSS POLARIZATIONS IN NON-CO-LOCATED POLARIZED ARRAY DESIGNS

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 20 days.

(21) Appl. No.: 18/343,643

(22) Filed: Jun. 28, 2023

(65) Prior Publication Data
US 2025/0007593 A1 Jan. 2, 2025

(51) Int. Cl.
*H04B 7/06* (2006.01)

(52) U.S. Cl.
CPC ....... *H04B 7/06958* (2023.05); *H04B 7/0623* (2013.01); *H04B 7/0639* (2013.01)

(58) Field of Classification Search
CPC ................................................ H04B 7/06958
USPC ......................................................... 375/262
See application file for complete search history.

(56) References Cited

U.S. PATENT DOCUMENTS

| | | |
|---|---|---|
| 2011/0150052 A1 | 6/2011 | Erell et al. |
| 2019/0097703 A1 | 3/2019 | Nilsson |
| 2022/0209428 A1 | 6/2022 | Raghavan et al. |
| 2023/0089409 A1* | 3/2023 | Woo ............... H01Q 9/0407 455/73 |
| 2023/0112997 A1 | 4/2023 | Xu et al. |
| 2024/0250730 A1* | 7/2024 | Wang ................ H04W 24/10 |

OTHER PUBLICATIONS

International Search Report and Written Opinion—PCT/US2024/032594—ISA/EPO—Dec. 5, 2024 (2304171WO).

\* cited by examiner

*Primary Examiner* — Lihong Yu
(74) *Attorney, Agent, or Firm* — Holland & Hart LLP

(57) ABSTRACT

Methods, systems, and devices for wireless communications are described. A user equipment (UE) or relay node may transmit a beam report indicating a polarization layer mismatch (achievable rates are different for the first and second polarizations, or positioning estimation accuracy is different for the first and second polarizations). The report may include an indication of an imbalance in signal strength, an estimation error for the two polarizations, one or more beam pairs that are not supported across the two polarizations, a preferred polarization, or a combination thereof. In response to the beam report, the network entity may adjust one or more parameters, and may transmit accordingly. A relay node may indicate non-co-located polarization array construction via capability information. The UE may then transmit feedback indicating a direction of steered beams at the UE. The relay node performs relay operations based on transmission characteristics selected from the beam direction information.

25 Claims, 18 Drawing Sheets

INDICATING BEAM PROPERTY CHANGES ACROSS POLARIZATIONS IN NON-CO-LOCATED POLARIZED ARRAY DESIGNS

FIELD OF TECHNOLOGY

The following relates to wireless communications, including indicating beam property changes across polarizations in non-co-located polarized array designs.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support indicating beam property changes across polarizations in non-co-located polarized array designs. For example, techniques described herein support indication of beam property changes across polarizations in non-co-located polarized array designs. A user equipment (UE), or relay node, may transmit a beam report indicating a polarization layer mismatch (achievable rates are different for the first and second polarizations/layers, or positioning estimation accuracy is different for the first and second polarizations/layers). The report may include an indication of an imbalance in signal strength, an estimation error for the two polarizations, one or more beam pairs that are not supported across the two polarizations, a preferred polarization, or a combination thereof. In response to the beam report, the transmitting device (e.g., the network entity) may adjust one or more parameters, and may transmit accordingly (e.g., may change its rank, transmit power, beam steering angle, etc.). Techniques described herein may also support rank limitation with non-co-located polarization arrays at relay nodes. A relay node may indicate non-co-located polarization array construction via capability information. The UE may then transmit feedback indicating a direction of steered beams at the UE. The relay node may transmit an indication of beam directions for one or both links upstream to the network entity, and then may perform relay operations based on transmission characteristics (e.g., rank, beam steering direction, etc.) selected based on the beam direction information.

A method for wireless communications by a wireless device is described. The method may include receiving first downlink signaling according to a first set of transmission properties via a first set of one or more beams, transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and receiving second downlink signaling according to a second set of transmission properties via a second set of one or more beams based on the beam report.

A wireless device for wireless communications is described. The wireless device may include one or more memories storing processor executable code, and one or more processors coupled with the one or more memories. The one or more processors may individually or collectively operable to execute the code to cause the wireless device to receive first downlink signaling according to a first set of transmission properties via a first set of one or more beams, transmit a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and receive second downlink signaling according to a second set of transmission properties via a second set of one or more beams based on the beam report.

Another wireless device for wireless communications is described. The wireless device may include means for receiving first downlink signaling according to a first set of transmission properties via a first set of one or more beams, means for transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and means for receiving second downlink signaling according to a second set of transmission properties via a second set of one or more beams based on the beam report.

A non-transitory computer-readable medium storing code for wireless communications is described. The code may include instructions executable by a processor to receive first downlink signaling according to a first set of transmission properties via a first set of one or more beams, transmit a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and receive second downlink signaling according to a second set of transmission properties via a second set of one or more beams based on the beam report.

Some examples of the method, wireless devices, and non-transitory computer-readable medium described herein may further include operations, features, means, or instructions for transmitting, via the beam report, an indication of a difference between a first signal strength corresponding to the first polarization and a second signal strength corresponding to the second polarization, where the mismatch between the first transmission rate and the second transmission rate corresponds to the difference between the first signal strength and the second signal strength.

Some examples of the method, wireless devices, and non-transitory computer-readable medium described herein may further include operations, features, means, or instructions for transmitting, via the beam report, an indication of an estimation error corresponding to the first positioning estimation accuracy, the second positioning estimation accuracy, or both, where the mismatch between the first positioning estimation accuracy and the second positioning estimation accuracy corresponds to the estimation error.

Some examples of the method, wireless devices, and non-transitory computer-readable medium described herein may further include operations, features, means, or instructions for transmitting, via the beam report, an indication of a preferred polarization including the first polarization or the second polarization.

Some examples of the method, wireless devices, and non-transitory computer-readable medium described herein may further include operations, features, means, or instructions for transmitting, via the beam report, an indication that a first beam, of the first set of one or more beams, corresponding to the first polarization may be not beam correspondent with a second beam, of the first set of one or more beams, corresponding to the second polarization.

Some examples of the method, wireless devices, and non-transitory computer-readable medium described herein may further include operations, features, means, or instructions for transmitting capability information including an indication of one or more beam pairs that may be not supported by the wireless device, each beam pair including a first beam corresponding to the first polarization and a second beam corresponding to the second polarization.

Some examples of the method, wireless devices, and non-transitory computer-readable medium described herein may further include operations, features, means, or instructions for transmitting a control message including the capability information and the beam report.

Some examples of the method, wireless devices, and non-transitory computer-readable medium described herein may further include operations, features, means, or instructions for transmitting a first control message including the beam report and transmitting a second control message including the capability information.

In some examples of the method, wireless devices, and non-transitory computer-readable medium described herein, receiving the first downlink signaling may include operations, features, means, or instructions for receiving the first downlink signaling according to the first polarization corresponding to a first antenna panel at a network entity and receiving the first downlink signaling according to a second antenna polarization corresponding to a second antenna panel at the network entity, where the first antenna panel and the second antenna panel may be non-co-located.

In some examples of the method, wireless devices, and non-transitory computer-readable medium described herein, the first set of transmission properties includes a first rank, a first transmission power, a first transmission rate, a first set of one or more beam steering angles, or any combination thereof, and the second set of transmission properties includes a second rank, a second transmission power, a second transmission rate, a second set of one or more beam steering angles, or any combination thereof.

In some examples of the method, wireless devices, and non-transitory computer-readable medium described herein, the wireless device includes a relay node or a user equipment (UE).

A method for wireless communications by a network entity is described. The method may include transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling, receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and transmitting, based on the beam report, second downlink signaling according to a second set of transmission properties via a second set of one or more beams and the first antenna panel and the second antenna panel.

A network entity for wireless communications is described. The network entity may include one or more memories storing processor executable code, and one or more processors coupled with the one or more memories. The one or more processors may individually or collectively operable to execute the code to cause the network entity to transmit first downlink signaling to a wireless device according to a first set of transmission properties via a first set of one or more beams and a first antenna panel corresponding to a first polarization of the first downlink signaling and a second antenna panel corresponding to a second polarization of the first downlink signaling, receive a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and transmit, based on the beam report, second downlink signaling according to a second set of transmission properties via a second set of one or more beams and the first antenna panel and the second antenna panel.

Another network entity for wireless communications is described. The network entity may include means for transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling, means for receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and means for transmitting, based on the beam report, second downlink signaling according to a second set of transmission properties via a second set of one or more beams and the first antenna panel and the second antenna panel.

A non-transitory computer-readable medium storing code for wireless communications is described. The code may include instructions executable by a processor to transmit first downlink signaling to a wireless device according to a first set of transmission properties via a first set of one or more beams and a first antenna panel corresponding to a first polarization of the first downlink signaling and a second antenna panel corresponding to a second polarization of the first downlink signaling, receive a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both, and transmit, based on the beam report, second downlink signaling according to a second set of transmission properties via a second set of one or more beams and the first antenna panel and the second antenna panel.

Some examples of the method, network entities, and non-transitory computer-readable medium described herein may further include operations, features, means, or instructions for receiving, via the beam report, an indication of a difference between a first signal strength corresponding to the first polarization and a second signal strength corresponding to the second polarization, where the mismatch between the first transmission rate and the second transmission rate corresponds to the difference between the first signal strength and the second signal strength.

Some examples of the method, network entities, and non-transitory computer-readable medium described herein may further include operations, features, means, or instructions for receiving, via the beam report, an indication of an estimation error corresponding to the first positioning estimation accuracy, the second positioning estimation accuracy, or both, where the mismatch between the first positioning estimation accuracy and the second positioning estimation accuracy corresponds to the estimation error.

Some examples of the method, network entities, and non-transitory computer-readable medium described herein may further include operations, features, means, or instructions for receiving, via the beam report, an indication of a preferred polarization including the first polarization or the second polarization.

Some examples of the method, network entities, and non-transitory computer-readable medium described herein may further include operations, features, means, or instructions for receiving, via the beam report, an indication that a first beam, of the first set of one or more beams, corresponding to the first polarization may be not beam correspondent with a second beam, of the first set of one or more beams, corresponding to the second polarization.

Some examples of the method, network entities, and non-transitory computer-readable medium described herein may further include operations, features, means, or instructions for receiving capability information including an indication of one or more beam pairs that may be not supported by a wireless device, each beam pair including a first beam corresponding to the first polarization and a second beam corresponding to the second polarization.

Some examples of the method, network entities, and non-transitory computer-readable medium described herein may further include operations, features, means, or instructions for transmitting a control message including the beam report and the capability information.

Some examples of the method, network entities, and non-transitory computer-readable medium described herein may further include operations, features, means, or instructions for transmitting a first control message including the beam report and transmitting a second control message including the capability information.

In some examples of the method, network entities, and non-transitory computer-readable medium described herein, the first set of transmission properties includes a first rank, a first transmission power, a first transmission rate, a first set of one or more beam steering angles, or any combination thereof, and the second set of transmission properties includes a second rank, a second transmission power, a second transmission rate, a second set of one or more beam steering angles, or any combination thereof.

In some examples of the method, network entities, and non-transitory computer-readable medium described herein, the wireless device includes a relay node or a UE.

A method for wireless communications by a relay node is described. The method may include transmitting, to a network entity, a UE, or both, capability information indicating that the relay node supports relay signaling using a first antenna panel corresponding to a first polarization and a second antenna panel corresponding to a second polarization, receiving, from the UE based on transmitting the capability information, an indication of a beam direction for the relay signaling at the UE, and relaying downlink signaling according to one or more transmission properties that are based on the indication of the beam direction for the relay signaling at the UE.

A relay node for wireless communications is described. The relay node may include one or more memories storing processor executable code, and one or more processors coupled with the one or more memories. The one or more processors may individually or collectively operable to execute the code to cause the relay node to transmit, to a network entity, a UE, or both, capability information indicating that the relay node supports relay signaling using a first antenna panel corresponding to a first polarization and a second antenna panel corresponding to a second polarization, receive, from the UE based on transmitting the capability information, an indication of a beam direction for the relay signaling at the UE, and relay downlink signaling according to one or more transmission properties that are based on the indication of the beam direction for the relay signaling at the UE.

Another relay node for wireless communications is described. The relay node may include means for transmitting, to a network entity, a UE, or both, capability information indicating that the relay node supports relay signaling using a first antenna panel corresponding to a first polarization and a second antenna panel corresponding to a second polarization, means for receiving, from the UE based on transmitting the capability information, an indication of a beam direction for the relay signaling at the UE, and means for relaying downlink signaling according to one or more transmission properties that are based on the indication of the beam direction for the relay signaling at the UE.

A non-transitory computer-readable medium storing code for wireless communications is described. The code may include instructions executable by a processor to transmit, to a network entity, a UE, or both, capability information indicating that the relay node supports relay signaling using a first antenna panel corresponding to a first polarization and a second antenna panel corresponding to a second polarization, receive, from the UE based on transmitting the capability information, an indication of a beam direction for the relay signaling at the UE, and relay downlink signaling according to one or more transmission properties that are based on the indication of the beam direction for the relay signaling at the UE.

Some examples of the method, relay nodes, and non-transitory computer-readable medium described herein may further include operations, features, means, or instructions for transmitting an indication of the beam direction for the relay signaling at the UE, a second beam direction for receiving the relay signaling at the relay node, or both, to a network entity, where relaying the downlink signaling may be based on transmitting the indication of the beam direction, the second beam direction, or both.

Some examples of the method, relay nodes, and non-transitory computer-readable medium described herein may further include operations, features, means, or instructions for transmitting an indication of a second beam direction for receiving the relay signaling at the relay node to the UE, where relaying the downlink signaling may be based on transmitting the indication of the second beam direction.

Some examples of the method, relay nodes, and non-transitory computer-readable medium described herein may further include operations, features, means, or instructions for selecting the one or more transmission properties including a transmission rank for forwarding the downlink signaling based on receiving the indication of the beam direction.

A method for wireless communications by a UE is described. The method may include receiving, from a relay node supporting relay procedures between at least the UE and a network entity, capability information indicating that the relay node supports relay signaling using a first antenna panel corresponding to a first polarization and a second antenna panel corresponding to a second polarization, transmitting to the relay node, the network entity, or both, based on receiving the capability information, an indication of a beam direction for the relay signaling at the UE, and receiving downlink signaling via the relay node according to one or more transmission properties that are based on the indication of the beam direction for the relay signaling at the UE.

A UE for wireless communications is described. The UE may include one or more memories storing processor executable code, and one or more processors coupled with the one or more memories. The one or more processors may individually or collectively operable to execute the code to cause the UE to receive, from a relay node supporting relay procedures between at least the UE and a network entity, capability information indicating that the relay node supports relay signaling using a first antenna panel corresponding to a first polarization and a second antenna panel corresponding to a second polarization, transmit to the relay node, the network entity, or both, based on receiving the capability information, an indication of a beam direction for the relay signaling at the UE, and receive downlink signaling via the relay node according to one or more transmission properties that are based on the indication of the beam direction for the relay signaling at the UE.

Another UE for wireless communications is described. The UE may include means for receiving, from a relay node supporting relay procedures between at least the UE and a network entity, capability information indicating that the relay node supports relay signaling using a first antenna panel corresponding to a first polarization and a second antenna panel corresponding to a second polarization, means for transmitting to the relay node, the network entity, or both, based on receiving the capability information, an indication of a beam direction for the relay signaling at the UE, and means for receiving downlink signaling via the relay node according to one or more transmission properties that are based on the indication of the beam direction for the relay signaling at the UE.

A non-transitory computer-readable medium storing code for wireless communications is described. The code may include instructions executable by a processor to receive, from a relay node supporting relay procedures between at least the UE and a network entity, capability information indicating that the relay node supports relay signaling using a first antenna panel corresponding to a first polarization and a second antenna panel corresponding to a second polarization, transmit to the relay node, the network entity, or both, based on receiving the capability information, an indication of a beam direction for the relay signaling at the UE, and receive downlink signaling via the relay node according to one or more transmission properties that are based on the indication of the beam direction for the relay signaling at the UE.

Some examples of the method, user equipment (UEs), and non-transitory computer-readable medium described herein may further include operations, features, means, or instructions for receiving, from the relay node, an indication of a second beam direction at the relay node, where receiving the downlink signaling may be based on receiving the indication of the second beam direction.

In some examples of the method, user equipment (UEs), and non-transitory computer-readable medium described herein, receiving the downlink signaling may include operations, features, means, or instructions for selecting the one or more transmission properties including a transmission rank for receiving the downlink signaling based on transmitting the indication of the beam direction.

DETAILED DESCRIPTION

Figure 1:
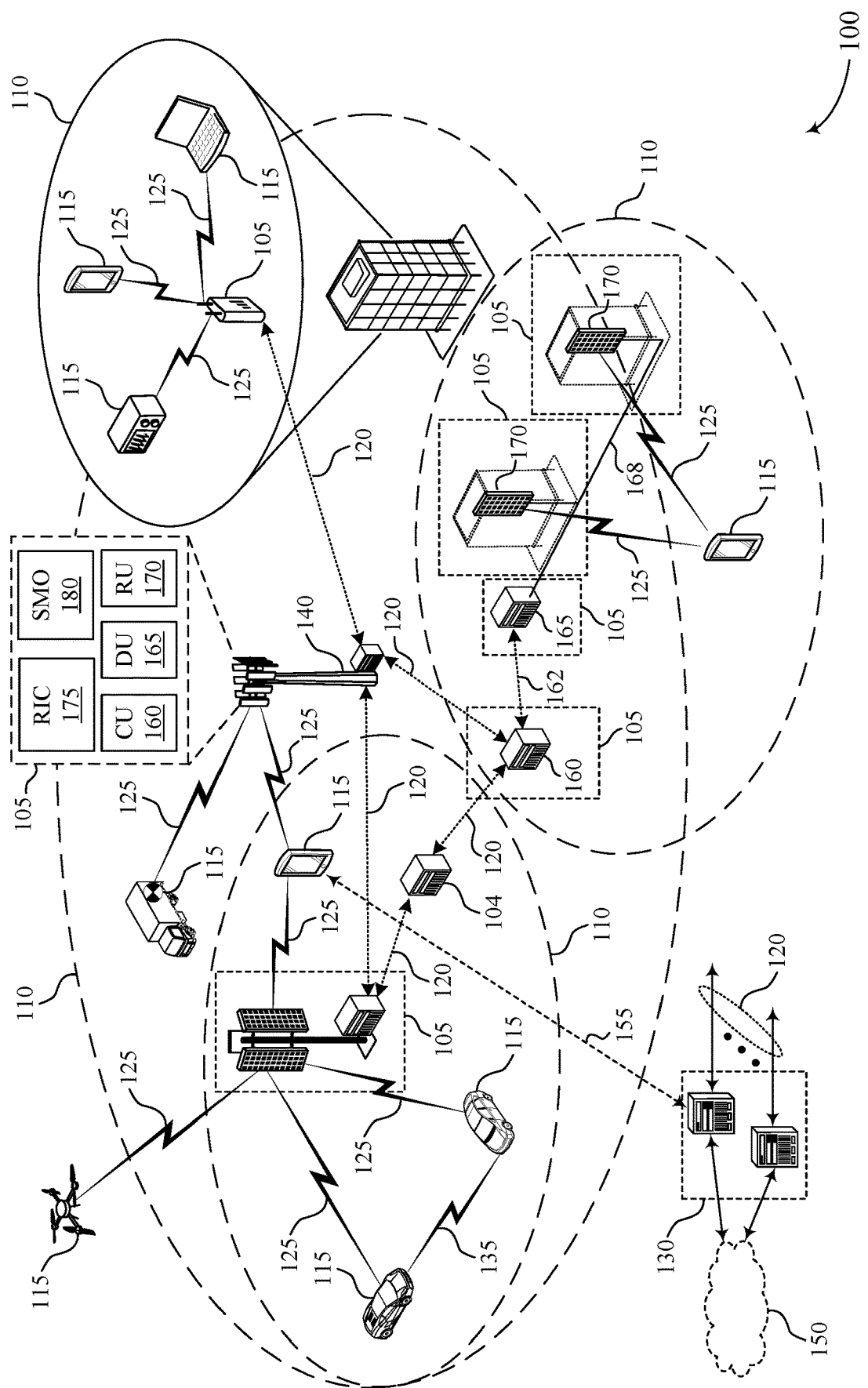
FIG. 1 shows an example of a wireless communications system that supports indicating beam property changes across polarizations in non-co-located polarized array designs in accordance with one or more aspects of the present disclosure.

Wireless devices in a wireless communications system may support large antenna arrays. Large antenna arrays may support increased throughput, but may introduce additional hardware, efficiency, and thermal issues. Techniques to address such complications may include isolation across polarizations (e.g., non-co-located dual-polarized arrays), where a first antenna panel uses a first polarization (horizontal linear polarization (e.g., H Pol) or co-polarization) and a second antenna panel uses a second polarization (e.g., vertical linear polarization (V Pol) or cross-polarization). Non-co-located antenna panels may reduce thermal issues by addressing module routing issues, while increasing throughput. However, such non-co-located antenna panels may not be identical in terms of array dimensions (e.g., a second polarization may rely on a ninety degree rotation of a first non-square antenna panel or array, in which case, the dimensions of the second polarization may not be the same as the dimensions of the first polarization). Such differences in array dimensions may result in changes to beam properties across polarizations. For instance, assumptions about the different polarizations may break down (e.g., beam directions, beamwidths, and beam angles of the different polarizations may be different). Beam pairs for dual-polarization may not function in some cases (e.g., because of the differences in beams for the two polarizations), resulting in failed transmissions and decreased throughput.

Additionally, such differences in polarizations and beams may lead to constant changes in rank (e.g., indicated via rank indicator (RI) signaling), which may in turn result in increased signaling overhead. For instance, in the case of a relay node (e.g., a reconfigurable intelligent surface (RIS)) which may be mobile, and a user equipment (UE) that may also be mobile, the beam directions for multiple links (e.g., between the relay node and the network entity, and between the relay node and the next device in a relay chain, such as the UE) may change rapidly over time. If a rank for the relaying of signaling by the relay node is defined by the lowest rank in the chain, then the relay node may have to constantly decrease its rank to 1 if one of the links in the chain drops to 1 as beam angles change and based on the different beams corresponding to the different polarizations. Changing RIs frequently may result in high complexity and frequent signaling, which may result in inefficient use of resources, decreased throughput, and decreased user experience.

Techniques described herein support indication of beam property changes across polarizations in non-co-located polarized array designs. For example, the UE (or relay node) may transmit a beam report indicating a polarization layer mismatch (achievable rates are different for the first and second polarizations, or positioning estimation accuracy is different for the first and second polarizations). The report may include an indication of an imbalance in signal strength, an estimation error (e.g., or difference) for the two polarizations, one or more beam pairs that are not supported across the two polarizations, a preferred polarization, or a combination thereof. In response to the beam report, the transmitting device (e.g., the network entity) may adjust one or more parameters, and may transmit accordingly (e.g., may change its rank, transmit power, beam steering angle, etc.). In some examples (e.g., in the beam report, or in separate signaling), the UE (or relay node) may transmit capability information indicating beam pairs (e.g., a subset of H-V beam pairs) that lack beam correspondence (resulting from the two polarizations). Then beam pair scheduling may be constrained to beam pairs that are available (e.g., those beams that have beam correspondence), which may reduce signaling overhead and introduce power savings.

Techniques described herein may also support rank limitation with non-co-located polarization arrays at relay nodes. A relay node (e.g., an RIS) may indicate non-co-located polarization array construction via capability information. The UE may then transmit feedback indicating a direction of steered beams at the UE. The relay node may transmit an indication of beam directions for one or both links upstream to the network entity, and then may perform relay operations based on transmission characteristics (e.g., rank, beam steering direction, etc.) selected based on the beam direction information. The relay node may automatically perform rank adaptation based on the beam direction information (e.g., instead of relying on constant or frequent RI signaling). The relay node may select a rank for each link based on the beam direction information. For instance, the relay node may receive downlink signaling via one polarization (a first antenna panel) and forward the downlink signaling via another polarization (a second antenna panel). In some examples, the relay node may receive downlink signaling via one rank (rank-2) and forward the signaling via another rank (rank-1).

Aspects of the disclosure are initially described in the context of wireless communications systems. Aspects of the disclosure are further illustrated by and described with reference to wireless communications systems, antenna array arrangements, and process flows. Aspects of the disclosure are further illustrated by and described with reference to apparatus diagrams, system diagrams, and flowcharts that relate to indicating beam property changes across polarizations in non-co-located polarized array designs.

FIG. 1 shows an example of a wireless communications system 100 that supports indicating beam property changes across polarizations in non-co-located polarized array designs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support indicating beam property changes across polarizations in non-co-located polarized array designs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein support indication of beam property changes across polarizations in non-co-located polarized array designs. For example, the UE 115 (or relay node) may transmit a beam report indicating a polarization layer mismatch (achievable rates are different for the first and second polarizations/layers, or positioning estimation accuracy is different for the first and second polarizations/layers). The report may include an indication of an imbalance in signal strength, an estimation error difference for the two polarizations, one or more beam pairs that are not supported across the two polarizations, a preferred polarization, or a combination thereof. In response to the beam report, the transmitting device (e.g., the network entity) may adjust one or more parameters, and may transmit accordingly (e.g., may change its rank, transmit power, beam steering angle, etc.). In some examples (e.g., in the beam report, or in separate signaling), the UE 115 (or relay node) may transmit capability information indicating beam pairs (e.g., a subset of H-V beam pairs) that lack beam correspondence (resulting from the two polarizations). Then beam pair scheduling may be constrained to beam pairs that are available (e.g., those that have beam correspondence), which may reduce signaling overhead and introduce power savings.

Techniques described herein may also support rank limitation with non-co-located polarization arrays at relay nodes. A relay node (e.g., an RIS) may indicate non-co-located polarization array construction via capability information. The UE 115 may then transmit feedback indicating a direction of steered beams at the UE 115. The relay node may transmit an indication of beam directions for one or both links upstream to the network entity, and then may perform relay operations based on transmission characteristics (e.g., rank, beam steering direction, etc.) selected based on the beam direction information. The relay node may automatically perform rank adaptation based on the beam direction information (e.g., instead of relying on constant or frequent RI signaling) thereby saving on control channel overhead. The relay node may select a rank for each link based on the beam direction information. For instance, the relay node may receive downlink signaling via one polarization (a first antenna panel) and forward the downlink signaling via another polarization (a second antenna panel). In some examples, the relay node may receive downlink signaling via one rank (rank-2) and forward the signaling via another rank (rank-1).

Figure 2:
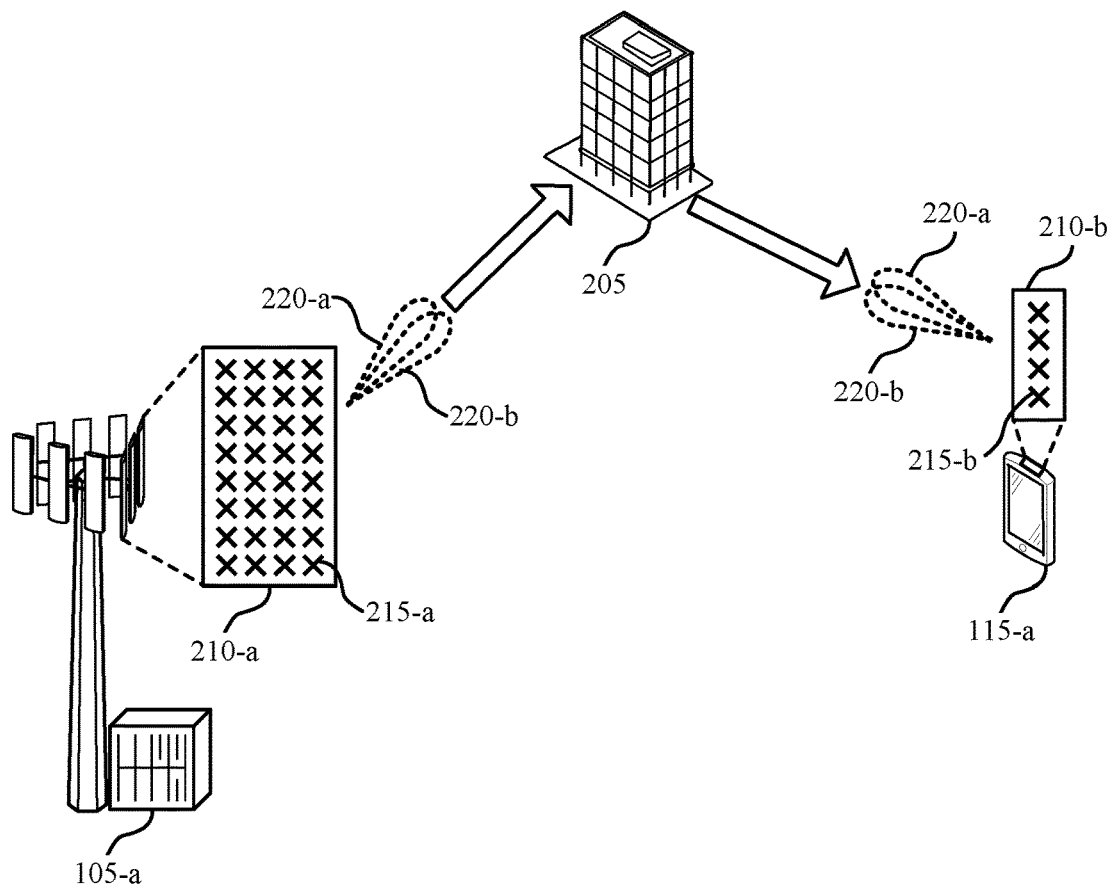
FIG. 2 shows an example of a wireless communications system that supports indicating beam property changes across polarizations in non-co-located polarized array designs in accordance with one or more aspects of the present disclosure.
Figure 2:
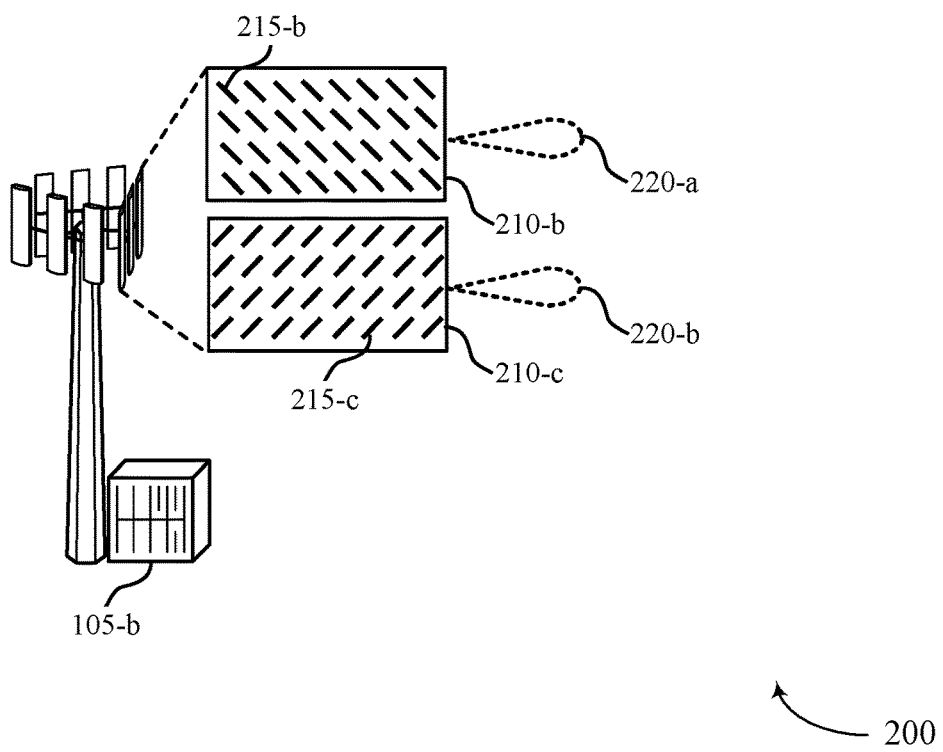

FIG. 2 shows an example of a wireless communications system 200 that supports indicating beam property changes across polarizations in non-co-located polarized array designs in accordance with one or more aspects of the present disclosure. The wireless communications system 200 may implement, or be implemented by, aspects of the wireless communications system 100. For example, the wireless communications system 200 may include one or more devices (e.g., a network entity 105-a, a network entity 105-b, and a UE 115-a), which may be examples of corresponding devices described with reference to FIG. 1.

A transmitting device (e.g., the network entity 105-a) may transmit signaling via one or more antenna panels 210 (e.g., the antenna panel 210-a). Each antenna panel 210 may include one or more antenna elements 215 (e.g., antenna elements 215-a). In some examples, the network entity 105-a may transmit downlink signaling (e.g., to the UE 115-a directly or indirectly via one or more relay nodes). The network entity 105-a may transmit downlink signaling via multiple polarizations, such as a first polarization 220-a (e.g., which may be referred to as Pol0, an H Pol, a slant +45 pol, or a co-polarization (co-pol)), and a second polarization 220-b (which may be referred to as Pol1, a V Pol, a slant −45 pol, or a cross-polarization (cross-pol)). Transmissions via a single antenna panel 210-a (e.g., where each antenna element 215-a corresponds to both the first polarization and the second polarization) may be referred to as a dual polarization transmissions via a co-located array (e.g., the antenna panel 210-a). The network entity 105-a may transmit downlink signaling via a single direction (e.g., a single beam) over both polarizations. In some examples, the downlink transmission may reflect off of one or more objects 205 (e.g., reflectors or even relay nodes).

The UE 115-a may be equipped with an antenna panel 210-b, and may receive downlink signaling via one or more antenna elements 215-b. The antenna panel 210-b may support dual polarization reception with a co-located array (e.g., the antenna panel 210-b). For example, the UE 115-a may receive the downlink signaling via a same direction (e.g., using a single beam) over both the first polarization and the second polarization.

In some examples, one or more devices (e.g., the network entity 105-a or the network entity 105-b) may support large antenna arrays. Such large antenna arrays may support millimeterwave operations in some frequency bands (e.g., FR2-1 encompassing 24.25 to 52.6 GHz). For instance, such an antenna array may include a 32×4 antenna array, or even larger. Various devices, such as network entities 105, (e.g., base stations, CPEs, IRS nodes, relay nodes, RISs, among other examples) may support large antenna arrays. Larger antenna arrays may support additional bands, such as FR2-2 (encompassing 52.6 to 71 GHz), and beyond (e.g., for smaller wavelengths) such as those corresponding to FR4 (71 to 114.25 GHz). Additionally, or alternatively, large antenna arrays may result in increasingly complex hardware designs, more complications in impedance matching, decreased antenna efficiencies, and increased thermal issues (e.g., thermal constraints may be associated with large antenna arrays).

In some examples, a device (e.g., the network entity 105-a) may support dual-polarized patch antenna elements 215-a for downlink transmissions (e.g., rank-2 transmissions and polarization MIMO gains). However, as more antenna elements 215-a are used in such large antenna arrays, feedline crossings may become more complicated, and more difficult to avoid. Such scenarios may lead to cross-feedline interferences that impacts the signal quality and hence an increase in jitter.

In some examples, to avoid the complications resulting from large dual polarization co-located antenna arrays, a device (e.g., the network entity 105-b) may support non-co-located polarizations to avoid feedline crossings. Isolation across polarizations may also be improved with non-co-located polarizations. For instance, the network entity 105-b may support a first antenna array (e.g., a first antenna panel 210-b) and a second antenna array (e.g., a second antenna panel 210-b). The first antenna array may include antenna elements 215-b corresponding to the first polarization 220-a, while the second antenna array may include antenna elements 215-c corresponding to the second polarization 220-b.

Non-co-located antenna array designs may result in better thermal management than co-located arrays (e.g., because antenna elements 215-b and antenna elements 215-c are distinct), simpler and improved routing designs because feedline crossings are decreased (e.g., which is especially helpful for large antenna arrays), and improved isolation (e.g., non-co-located arrays may support improved isolation between polarizations 220). Such improved isolation may improve various signaling functions, including radar signaling. Non-co-located antenna arrays may further improve performance including uncorrelation (e.g., non-co-located arrays may be more uncorrelated than co-located arrays because coupling across layers is decreased), which may support non-polarization and spatial MIMO gains.

Techniques described herein support indication of beam property changes across polarizations in non-co-located polarized array designs. For example, the UE 115-a (or a relay node) may transmit a beam report indicating a polarization layer mismatch (achievable rates are different for the first and second polarizations, or positioning estimation accuracy is different for the first and second polarizations). The report may include an indication of an imbalance in signal strength, an estimation error difference for (e.g., between) the two polarizations, one or more beam pairs that are not supported across the two polarizations, a preferred polarization, or a combination thereof. In response to the beam report, the transmitting device (e.g., the network entity) may adjust one or more parameters, and may transmit accordingly (e.g., may change its rank, transmit power, beam steering angle, etc.). Techniques described herein may also support rank limitation with non-co-located polarization arrays at relay nodes. A relay node (e.g., an RIS) may indicate non-co-located polarization array construction via capability information. The UE 115-a may then transmit feedback indicating a direction of steered beams at the UE 115-a. The relay node may transmit an indication of beam directions for one or both links upstream to the network entity, and then may perform relay operations based on transmission characteristics (e.g., rank, beam steering direction, etc.) selected based on the beam direction information.

Figure 3:
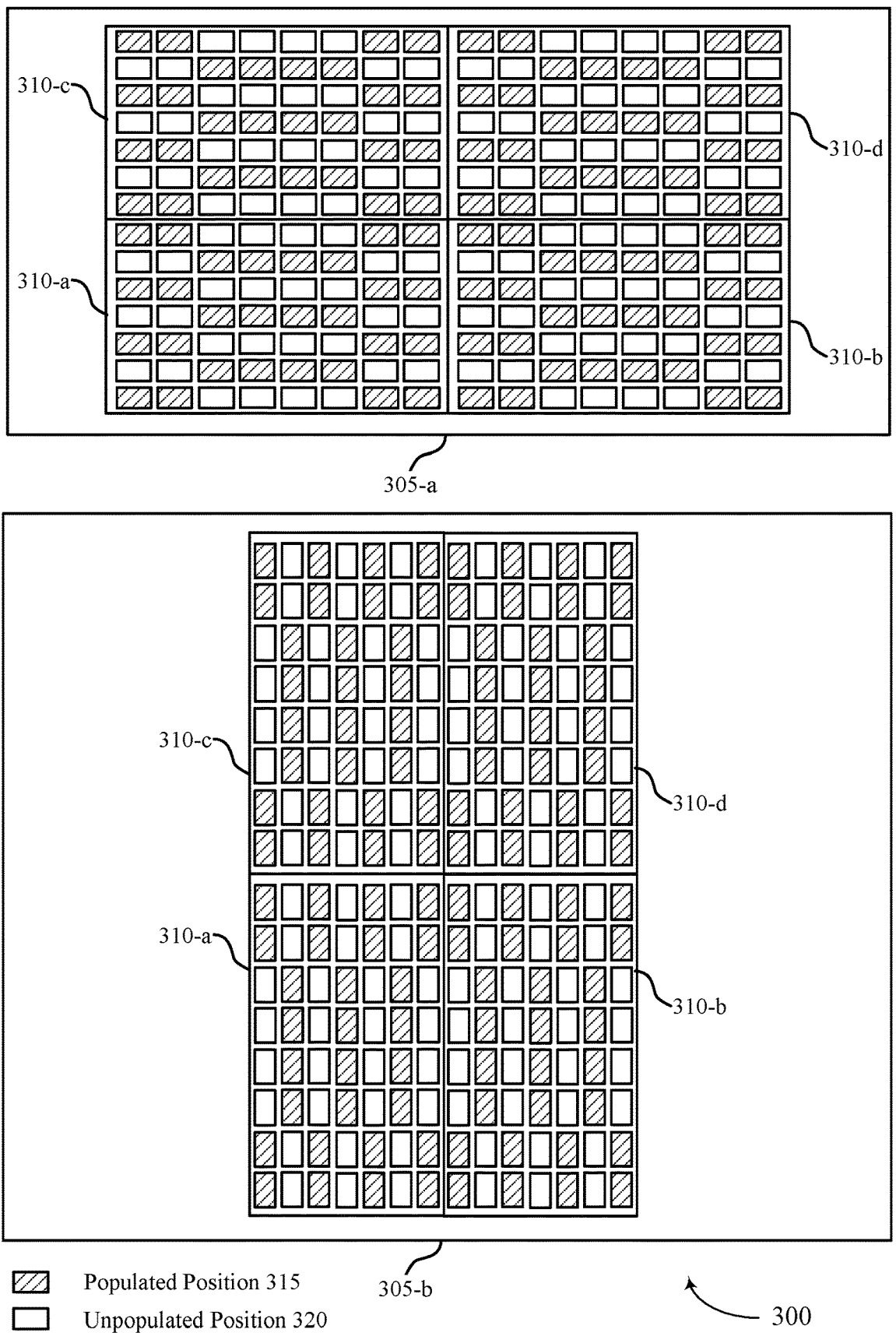
FIG. 3 shows an example of an antenna array arrangement that supports indicating beam property changes across polarizations in non-co-located polarized array designs in accordance with one or more aspects of the present disclosure.

FIG. 3 shows an example of an antenna array arrangement 300 that supports indicating beam property changes across polarizations in non-co-located polarized array designs in accordance with one or more aspects of the present disclosure. Antenna array arrangement 300 may implement, or be implemented by, aspects of the wireless communications system 100. For example, the antenna array arrangement 300 may be supported by one or more devices (e.g., a network entity 105, one or more relay nodes, and one or more UEs 115), which may be examples of corresponding devices described with reference to FIG. 1 and FIG. 2.

Large antenna arrays may be constructed via the tiling of smaller panels. For instance, a first antenna array 305-a (e.g., a first antenna panel, a portion of a first antenna panel, or a combination of multiple antenna panels) may include multiple tiles 310 (e.g., the tile 310-a, the tile 310-b, the tile 310-c, and the tile 310-d). The first antenna array 305-a may be defined as a construction as a same panel tiled many times, resulting in a larger array (e.g., each tile 310 may be the same). Array dimensions may remain the same for both polarizations for a smaller antenna panel that is square (e.g., the same number of antenna elements along each edge of the antenna array).

In some cases, an antenna panel may be uni-polarized, and may be rectangular (e.g., non-square) in terms of array dimensions. A non-square panel may arise because there may be more antenna elements on an antenna panel than there are RFIC feeds for antenna elements. Some antenna elements may therefore be shared across feeds, effectively creating a non-square pattern in terms of beamforming.

In some examples, a second polarization may be created by rotating a panel by ninety degrees, which may result in a second antenna array 305-b. The array dimensions of the second polarization (e.g., the second antenna array 305-b) may not be the same as the array dimensions of the first polarization (e.g., the first antenna array 305-a). When a panel is tiled many times (e.g., the antenna array 305-b includes the same tiles 310, but each tile 310 is rotated by ninety degrees from the position of each tile in the antenna array 305-*a*), the array dimensions of the first antenna array 305-*a* and the second antenna array 305-*b* may not be the same. For instance, the location of populated positions 315 and unpopulated positions 320 may not be the same place (e.g., populated positions 315 may not correspond to the same antenna element position). In such examples, non-co-located designs may have similar array dimensions across polarizations, but may not have the same array dimensions across polarizations. In some examples, the antenna array 305-*a* may be an example of the antenna panel 210-*b*, and the second antenna array 305-*b* may be an example of the antenna panel 210-*c*.

In some examples, non-co-located antenna array designs may result in changes in beam properties across polarizations. For example, a 60 GHz tiling of a panel 4 times (e.g., twice in azimuth direction and twice in elevation direction), and the antenna array 305-*a* (e.g., the first polarization or V pol array) may support a dimension of 16×14, whereas the second antenna array 305-*b* (e.g., the second polarization of H Pol array) may support a dimension of 14×16 (e.g., due to the 90 degree rotation). When all panels are tiled 16 times (e.g., 8 times in the azimuthal direction and 2 times in the elevation direction), the first antenna array (e.g., the first polarization or the V pol) may have a dimension of 64×14, whereas the second antenna array (e.g., the second polarization or the H pol array) may support a dimension of 56×16.

Because array dimensions for different polarizations (e.g., the H pol and the V pol) are different, design principles of analog or hybrid beamforming weights may be different across arrays. For instance, codebook designs may be complicated for non-co-located polarized arrays compared to co-located polarized arrays because the objective of the codebook design may be to increase overlap across beams. For instance, a quantity of beams in each level of a hierarchy of a beam codebook could be different for different polarizations, a total quantity of beams across all hierarchies could be different for different polarizations, beamwidths of beams transmitted via different polarizations (e.g., even if transmitted in the same beam steering direction) may be different, or beam directions for transmitting the different polarizations (e.g., beam pairs) may be different, among other examples. As a result, in a cluster in the channel associated with a certain angular spread, rate differences across different polarization layers due to beamwidth differences may be observed by a receiving device (e.g., a receiving UE, or receiving relay node). In some examples, because an azimuthal angle of arrival (AoA), zenith angle of arrival (ZoA), or both (e.g., in an uplink mode), or azimuthal angle of departure (AoD), zenith angle of departure (ZoD), or both (e.g., in a downlink mode) based positioning estimation may depend on a beamwidth of beams used. As a result, positioning estimation may suffer or be impossible across one or the two polarization layers.

Techniques described herein support indication of beam property changes across polarizations in non-co-located polarized array designs. For example, the UE (or relay node) may transmit a beam report indicating a polarization layer mismatch (achievable rates are different for the first and second polarizations/layers, or positioning estimation accuracy is different for the first and second polarizations/layers). The report may include an indication of an imbalance in signal strength, an estimation error difference for the two polarizations, one or more beam pairs that are not supported across the two polarizations, a preferred polarization, or a combination thereof. In response to the beam report, the transmitting device (e.g., the network entity) may adjust one or more parameters, and may transmit accordingly (e.g., may change its rank, transmit power, beam steering angle, etc.). Techniques described herein may also support rank limitation with non-co-located polarization arrays at relay nodes. A relay node (e.g., an RIS) may indicate non-co-located polarization array construction via capability information. The UE may then transmit feedback indicating a direction of steered beams at the UE. The relay node may transmit an indication of beam directions for one or both links upstream to the network entity, and then may perform relay operations based on transmission characteristics (e.g., rank, beam steering direction, etc.) selected based on the beam direction information.

Figure 4:
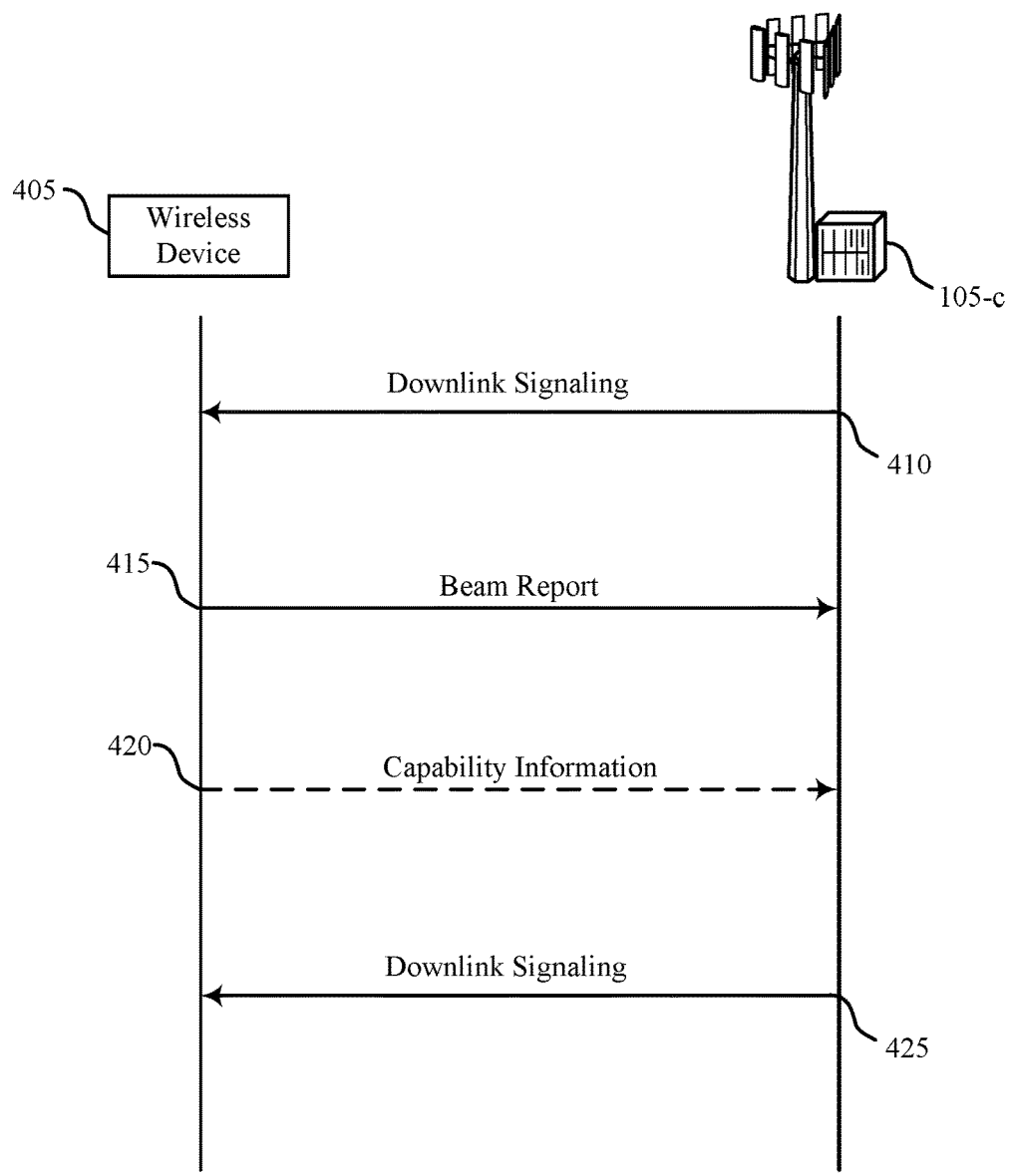
FIG. 4 shows an example of a process flow that supports indicating beam property changes across polarizations in non-co-located polarized array designs in accordance with one or more aspects of the present disclosure.

FIG. 4 shows an example of a process flow 400 that supports indicating beam property changes across polarizations in non-co-located polarized array designs in accordance with one or more aspects of the present disclosure. The process flow 400 may implement, or be implemented by, aspects of the wireless communications system 100, the wireless communications system 200, the antenna array arrangement 300, or any combination thereof. For instance, the process flow 400 may include a wireless device 405, and a network entity 105-*c*, which may be examples of corresponding devices described with reference to FIGS. 2-4. The wireless device may be an example of a UE 115, a relay node (e.g., such as an reconfigurable intelligent surface (RIS), an intelligent reflective surface (IRS), among other examples), or a network entity. For instance, the wireless device 405 may be a receiving device (e.g., the network entity 105-*c* may communicate directly with the receiving device, or may communicate with the receiving device via one or more intermediate or relay devices), or the wireless device 405 may be a relay node (e.g., receiving signaling from the network entity 105-*c* and forwarding the received signaling to one or more downstream devices, including a receiving device such as a UE 115). In some examples, the network entity 105-*c* may transmit downlink signaling using a non-co-located dual polarization antenna array (e.g., such as the first antenna array 305-*a* and the second antenna array 305-*b*, or the first antenna panel 210-*b* and the second antenna panel 210-*c*, among other examples).

At 410, the wireless device 405 may receive downlink signaling (e.g., first downlink signaling) directly from the network entity 105-*c*, or via one or more relay nodes. The network entity 105-*c* may transmit, and the wireless device 405 may receive, the downlink signaling according to a first set of transmission properties via a first set of one or more beams. The wireless device 405 may receive the first downlink signaling according to the first polarization corresponding to a first antenna panel or antenna array at the network entity 105-*c*, and may receive the first downlink signaling according to the second polarization corresponding to a second antenna panel or second antenna array at the network entity 105-*c*. The first antenna panel and the second antenna panel (e.g., or first and second antenna arrays) may not be co-located (e.g., may be non-co-located). The respective sets of transmission properties may include a rank (e.g., rank-1, rank-2), a transmission power, a transmission rate, one or more beam steering angles (e.g., AoA, ZoA, AoD, ZoD), or any combination thereof.

In some examples, as described herein, a wireless device 405 (e.g., a UE 115, or a relay node) may indicate a polarization layer mismatch with respect to achievable rates and positioning estimation accuracy. At 415, the wireless device 405 may transmit a beam report. The beam report may indicate a polarization layer mismatch between a first polarization of the first downlink signaling and a second polarization of the first downlink signaling (e.g., resulting from the non-co-located antenna arrays for the different polarizations at the network entity 105-c).

The mismatch for rate may correspond to an imbalance in signal strength (e.g., in dB). For instance, the polarization layer mismatch may indicate a mismatch between a first transmission rate for the first polarization and a second transmission rate for the second polarization, a mismatch between a first positioning estimation accuracy for the first polarization and a second positioning estimation accuracy corresponding to the second polarization, or both. The mismatch between the first transmission rate and the second transmission rate may correspond to the difference between the first signal strength and the second signal strength. For instance, the beam report may include an indication of a difference between a first signal strength corresponding to the first polarization and a second signal strength corresponding to the second polarization. The beam report may include an indication of the measured signal strengths for the two polarizations, a difference between the two signal strengths, a signal strength offset or change, among other examples.

The mismatch for positioning estimation may be an estimation error. In some examples, the beam report may include an indication of an estimation error corresponding to the first positioning estimation accuracy, the second positioning estimation accuracy, or both. The mismatch between the first positioning estimation accuracy and the second positioning estimation accuracy corresponds to the estimation error. In some examples, the beam report may include an indication of a positioning estimation error, which may implicitly indicate the polarization level mismatch. In some examples, the beam report may include a current or historic positioning estimation error, a positioning error based on the first polarization, the second polarization, or both, a difference between positioning estimation errors generated based on the respective polarizations, or any combination thereof.

The wireless device 405 may transmit, in the beam report, an indication of a best or preferred polarization layer (e.g., for either key performance indicator (KPI) of the two polarizations or two beams of a beam pair). In some examples, the beam report may include an indication of a preferred polarization comprising the first polarization or the second polarization.

Because array dimensions of the arrays at the network entity 105-c, some beams for the H pol or the V pol arrays may not be beam correspondent with any beam on the V pol array. In some examples, the beam report may include an indication that a first beam, of the first set of one or more beams, corresponding to the first polarization is not beam correspondent with a second beam, of the first set of one or more beams, corresponding to the second polarization.

At 420, the wireless device 405 may transmit capability information including an indication of one or more beam pairs that are not supported by the wireless device 405. Each beam pair may include a first beam corresponding to the first polarization and a second beam corresponding to the second polarization. A lack of beam correspondence for a subset of beam pairs (e.g., H-V beam pairs, beams corresponding to the first polarization and the second polarization). may be indicated as UE capability information. Beam pair scheduling may be constrained to those beam pairs that indicate availability of beam correspondence, which may reduce uplink and downlink signaling to identify and select appropriate beams, and may result in increased power savings).

In some examples, the wireless device 405 may transmit a single control message including both the beam request and the capability information (e.g., the beam request and the capability information may be included in a single message, may be multiplexed, or the capability information may be included in the beam report). In some examples, the wireless device 405 may transmit a first control message including the beam report and a second control message including the capability information.

At 425, the wireless device 405 may receive (e.g., directly or via one or more relay nodes) downlink signaling (e.g., second downlink signaling) according to a second set of transmission properties via a second set of one or more beams based at least in part on the beam report. The wireless device 405 may receive the second downlink signaling according to the first polarization corresponding to the first antenna panel or antenna array at the network entity 105-c, and may receive the second downlink signaling according to the second polarization corresponding to the second antenna panel or second antenna array at the network entity 105-c. The first antenna panel and the second antenna panel (e.g., or first and second antenna arrays) may not be co-located (e.g., may be non-co-located).

The second transmission properties may include a rank (e.g., rank-1, rank-2), a transmission power, a transmission rate, one or more beam steering angles (AoA, ZoA, AoD, ZoD), or any combination thereof. For example, rank switching (e.g., via RI signaling or via any other means or mechanism) may occur for non-co-located polarized arrays (e.g., depending on an angle at which reflected rays are aligned). In some examples of a relay node (e.g., an IRS node, a CPE, a relay node, a repeater, an RIS, among other examples), a repeater node may provide rank-2 performance so as to enable a line-of-sight or strong path from the network entity 105-c to a receiving UE 115. However, depending on an angle at which the repeater node reflects energy, rank-2 transmission, or polarized MIMO performance may be degraded. In some examples, based on the beam report transmitted at 415, the network entity 105-c may transmit the second downlink signaling at 425 according to one or more updated transmission characteristics (e.g., a new set of beams, a new rank (e.g., rank-1 instead of rank-2), a new beam steering angle for one beam or for a beam pair (e.g., for respective polarizations), or any combination thereof.

Figure 5:
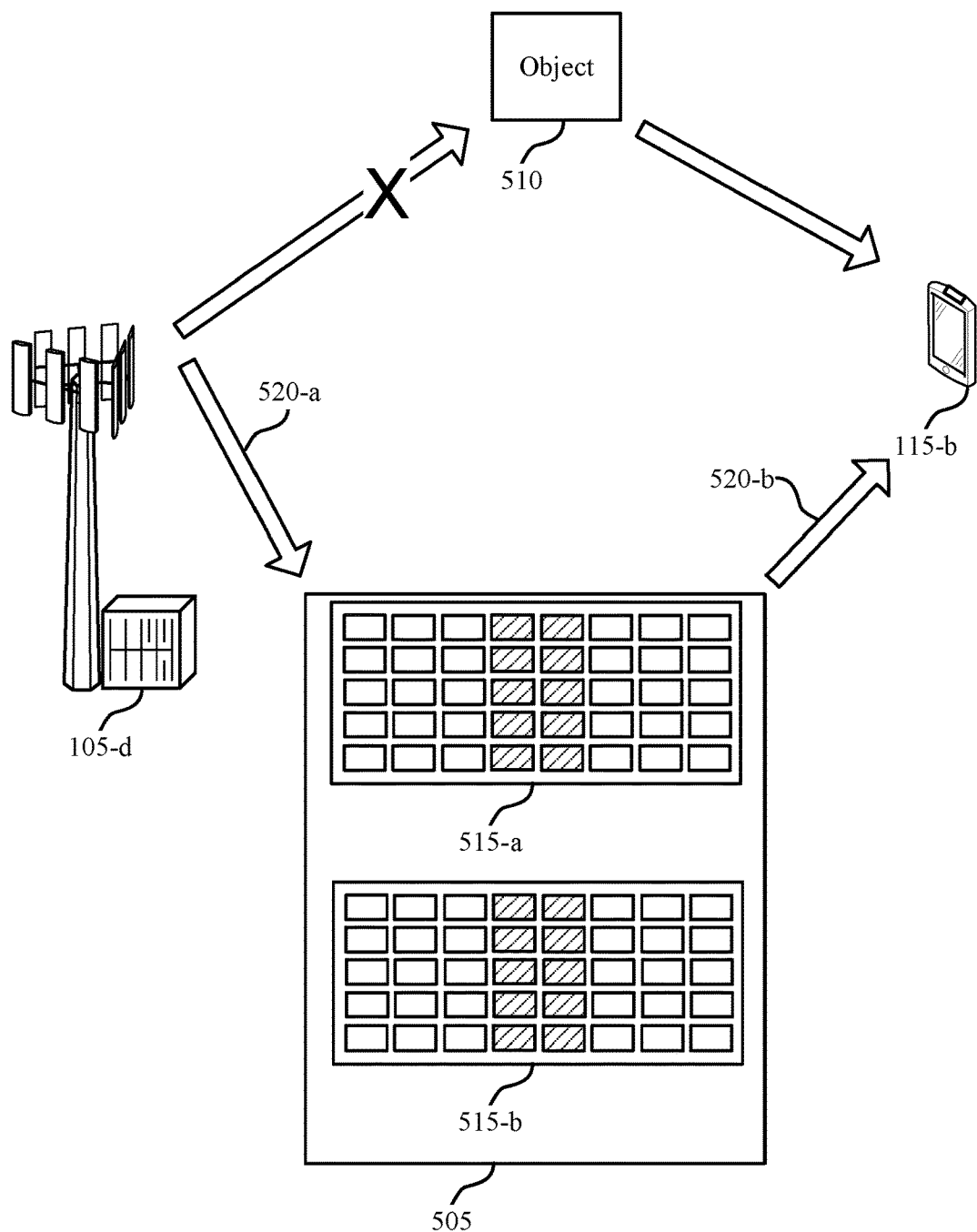
FIG. 5 shows an example of a wireless communications system that supports indicating beam property changes across polarizations in non-co-located polarized array designs in accordance with one or more aspects of the present disclosure.

FIG. 5 shows an example of a wireless communications system 500 that supports indicating beam property changes across polarizations in non-co-located polarized array designs in accordance with one or more aspects of the present disclosure. The wireless communications system 500 may implement, or be implemented by, aspects of the wireless communications system 100, the wireless communications system 200, the antenna array arrangement 300, the process flow 400, or any combination thereof. For example, the wireless communications system 500 may include one or more devices (e.g., a network entity 105-d, a UE 115-b, and a relay node 505), which may be examples of corresponding devices described with reference to FIG. 1. For instance, the relay node 505 may be an example of a network entity 105 (e.g., an IAB node), an RIS, an IRS node, a CPE, or a UE 115, among other examples).

In some examples, the network entity 105-d may communicate with the UE 115-b via a multi-node link (e.g., via the relay node 505). For instance, the network entity 105-d may transmit downlink signaling to the UE via a first portion of a link (e.g., the link 520-a) and a second portion of the link (e.g., the link 520-b). A direct path between the network entity 105-*d* and the UE 115-*b* may be blocked (e.g., by the object 510, by system interference, by another obstruction, among other examples).

The network entity 105-*d*, and the UE 115-*b* may support a co-located polarized array designs. The relay node 505 may support non-co-located polarization. For instance, an antenna array at the relay node 505 may support a large number of antenna elements, which may include a first antenna panel 515-*a* (e.g., or a first subset of a total antenna array), a second antenna panel 515-*b* (e.g., or a second subset of the total antenna array). The first antenna panel 515-*a* may correspond to a first polarization (e.g., an H pol), and the second antenna panel 515-*b* may correspond to a second polarization (e.g., a V pol). Because the array dimensions of the first antenna panel 515-*a* and the second antenna panel 515-*b* may be different, design principles of analog or hybrid beamforming weights may be different across arrays. Beam properties across polarizations may be different. A quantity of beams in each level of hierarchy of a beam codebook (e.g., hierarchical beam codebooks) may be different across polarizations, a total quantity of beams across all hierarchies may be different across polarizations, or both. Beamwidth of beams (e.g., even beams designed for the same steering direction) may be different across the first and second polarization. For example, in an illustrative case, a V pol tile may be of array dimensions 8×6. The corresponding 90 degree rotated H pol tile may be of array dimensions 6×8. When this tile is tiled 4 times in azimuth and 2 times in elevation domain, the size of the V pol array may be 32×12 whereas the H pol array size may be 24×16. With an azimuthal coverage region of +/−45 degrees around the boresight direction and an elevation coverage region of +/−15 degrees around the boresight direction, the V pol array needs a codebook of approximately 30 beams in the azimuthal domain and 4 beams in the elevation domain (a Kronecker product codebook of size 30×4=120) and the H pol array needs a codebook of approximately 22 beams in the azimuthal domain and 5 beams in the elevation domain (for a Kronecker product codebook of size 22×5=110) for comparable performance. The comparable performance metric in such cases is that the crossover point between adjacent beams is approximately 3 dB down from the peak gain of 10·log 10(32×12)=10·log 10(24×16)=25.8 dB.

In some examples, a rank achieved by the UE 115-*b* in communication with the network entity 105-*d* may be determined by the weakest node in the link (e.g., the non-co-located polarization array at the relay node 505). Depending on the direction in which the beams are steered over either part of the link (e.g., the link 520-*a* or the link 520-*b*), rank-2 transmissions may or may not be possible on either the link 520-*a* or the link 520-*b*. For instance, the relay node 505 may experience a weak beam for the antenna panel 515-*b* (e.g., only supporting rank-1 transmissions via the antenna panel 515-*a*). In some examples, the relay node 505 may support strong receive beams via both the first antenna panel 515-*a* (e.g., the first polarization) and the second antenna panel 515-*b* (e.g., the second polarization), thus supporting rank-2 reception from the network entity 105-*d*, but may experience a weak transmission beam for the link 520-*b* for the one of the antenna panels (e.g., the antenna panel 515-*b*), thus supporting rank-1 transmission to the UE 115-*b*. In such examples, despite a capability to support rank-2 communications via one link 520, due to limitations to rank-1 transmissions via another link 520, all transmissions between the network entity 105-*d* and the UE 115-*b* may be limited to rank-1 (e.g., the lowest supported rank across all portions of the link). In some examples, the relay node 505 indicate a rank, or rank-1 conditions, for either part of the link (e.g., the link 520-*a* or the link 520-*b*) to the network entity 105-*d*, or the UE 115-*b*, or both.

In some examples, RI may be used to indicate a change from rank-2 to rank-1, or vice versa. However, the UE 115-*b* may be mobile, and a small change in distance (e.g., with reference to the relay node 505) may correspond to a change in a steered direction of a beam (e.g., for the link 520-*b*), which may result in a change in rank (e.g., from rank-1 to rank-2, or from rank-2 to rank-1). Overhead associated with RI changes and indications may result in significant signaling overhead, decreased efficiency in the use of available system resources, increased delays and system latency, and decreased throughout.

In some examples, as described herein, the relay node 505 may transmit capability information indicating non-co-located dual polarization antenna arrays at the relay node 505, and the UE 115-*b* may report beam direction information to the relay node 505, the network entity 105-*d*, or both. The UE 115-*a* may be mobile, changing position and beams regularly. According to techniques described herein, rank change may be a more deterministic function of the path traversed by the UE 115-*a*. In some examples, the relay node 505 may transmit capability information including an indication of a non-co-located polarization array construction. The relay node 505 may transmit the capability information to the network entity 105-*d*, the UE 115-*b*, or both (e.g., may unicast the capability information to one or both of the network entity 105-*d* and the UE 115-*b*, or may broadcast the capability information, or may transmit the capability information to the network entity 105-*d*, which may provide the information to the UE 115-*b*).

The UE 115-*b* may transmit an indication of a direction of a steered beam at the UE 115-*b*. For example, based on receiving the capability information, the UE 115-*b* may feed back the direction of the steered beam at the UE 115-*b* (e.g., instead of RI) to the relay node 505. The feedback indicating the beam steering direction or angle may support rank-2 communications on one part of the link, and rank-1 on another part of the link, which may support better rate-latency tradeoffs. For instance, based on the beam direction information at the UE 115-*b*, the relay node 505 may support rank-2 communications received from the network entity 105-*d* via the link 520-*a* (e.g., via the first polarization at the antenna panel 515-*a* and the second polarization at the antenna panel 515-*b*), and may support rank-1 communications transmitted to the UE 115-*b* via the link 520-*b* (e.g., via the first polarization at the antenna panel 515-*a* or the second polarization at the antenna panel 515-*b*, based on which beam is preferred according to the beam steering direction indicated by the UE 115-*b*). The feedback may further allow the relay node 505 to adapt rank automatically without RI feedback from the UE 115-*b*. Signaling indicating beam direction may be simpler (e.g., less complex) and more robust to feedback errors (e.g., a small error in the feedback quantity can lead to a significant distortion for RI, but not for angle information; further, feedback overhead may also be reduced with less frequent reporting and angle information is the same across bands in contrast to RI information across bands) than RI signaling, and may therefore provide information based on which rank may be selected with less signaling overhead than RI signaling. That is, the relay node 505 may determine whether to use rank-1 or rank-2 based on the beam steering direction information received from the UE 115-*b*, instead of the higher complexity RI signaling.

In some examples, the relay node 505 may also be mobile. In such examples, rank information may not only be depending on an angle (e.g., direction) of a steered beam of the link 520-*b* (e.g., the portion of the link between the relay node 505 and the UE 115-*b*). Rank information may also be dependent on the angle of a steered beam for the link 520-*a* (e.g., the portion of the link between the relay node 505 and the network entity 105-*d*). The relay node 505 may feedback steered beam directions of both parts of the link (e.g., one or more beam steering directions for the link 520-*b*, and one or more beam steering directions for the link 520-*a*) to the network entity 105-*d*, the UE 115-*b*, or both. Rank adaptation (e.g., by the network entity 105-*d*, the UE 115-*b*, the relay node 505, or any combination thereof) may be automatic based on the feedback (e.g., the indication of beam steering directions from the link 520-*a* and the link 520-*b*). Techniques described herein may be applied to downlink signaling (e.g., from the network entity 105-*d* to the UE 115-*b*, in which case the relay node 505 may report a receive beam for the link 520-*a*, a transmit beam for the link 520-*b*, a receive beam for the UE 115-*b* reported by the UE 115-*b*, or any combination thereof) or to uplink signaling (e.g., from the UE 115-*b* to the network entity 105-*d*, in which case the relay node 505 may report a transmit beam for the link 520-*a*, a receive beam for the link 520-*b*, a transmit beam for the UE 115-*b* reported by the UE 115-*b*, or any combination thereof).

The relay node 505 may receive information from the network entity 105-*d* via one polarization, and may forward the signaling to the UE in another polarization (e.g., may receive the downlink signaling via the first polarization and the first antenna panel 515-*a*, and forward the signaling via the second polarization and the second antenna panel 515-*b*, or may receive the downlink signaling via the second polarization and the second antenna panel 515-*b* and forward the signaling via the first polarization and the first antenna panel 515-*a*). Similarly, the relay node 505 may receive uplink signaling via one polarization and forward the signaling via another polarization. Such an approach may avoid self-interference at the relay node in dual-polarized full duplex communications.

Figure 6:
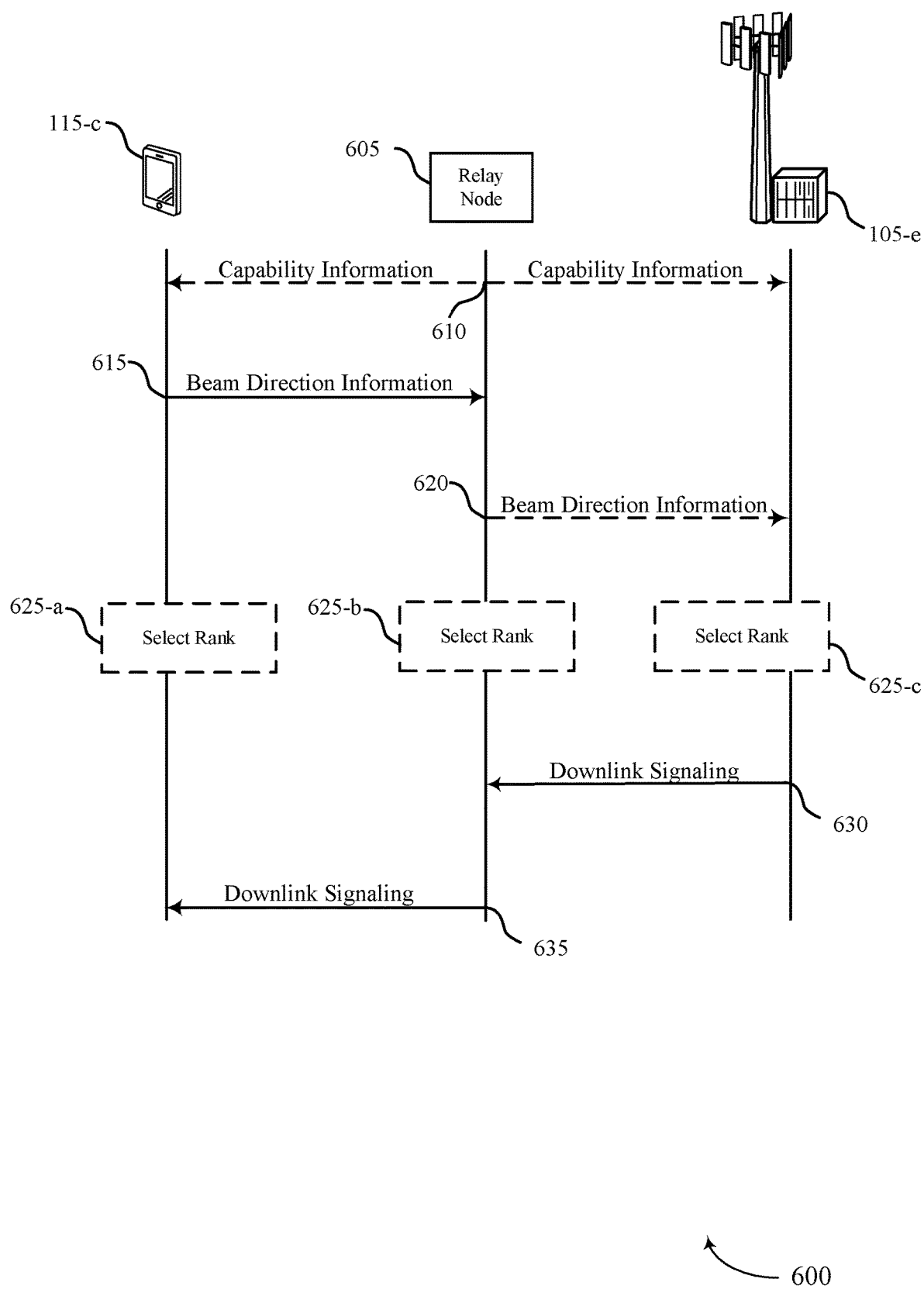
FIG. 6 shows an example of a process flow that supports indicating beam property changes across polarizations in non-co-located polarized array designs in accordance with one or more aspects of the present disclosure.

FIG. 6 shows an example of a process flow 600 that supports indicating beam property changes across polarizations in non-co-located polarized array designs in accordance with one or more aspects of the present disclosure. The process flow 600 may implement aspects of, or be implemented by aspects of, the wireless communications system 100, the wireless communications system 200, the antenna array arrangement 300, the process flow 400, the wireless communications system 500, or any combination thereof. For example, the process flow 600 may include a network entity 105-*e*, a UE 115-*c*, and a relay node 605, which may be examples of corresponding devices described with reference to FIGS. 1-5.

At 610, the relay node 605 may transmit (e.g., to the network entity 105-*e*, the UE 115-*c*, or both) capability information. The capability information may indicate that the relay node 605 supports relay signaling using a first antenna panel corresponding to a first polarization and a second antenna panel corresponding to a second polarization (e.g., the relay node 605 may be an example of the relay node 505 as described with reference to FIG. 5).

At 615, the UE 115-*c* may transmit (e.g., to the relay node 605, the network entity 105-*e*, or both) an indication of a beam direction for the relay signaling at the UE 115-*c*, based at least in part on receiving the capability information.

At 620, the relay node 605 may transmit beam direction information (e.g., an indication of the beam direction for the relay signaling at the UE, a second beam direction for receiving the relay signaling at the relay node, or both). For example, the relay node 605 may transmit the beam steering direction information received from the UE 115-*c* at 615 (e.g., a receive beam used by the UE 115-*c*), and may further transmit an indication of a transmit beam steering direction at the relay node 605 for forwarding downlink signaling, a beam steering direction at the relay node 605 for receiving downlink signaling from the network entity 105-*e*, or both. In some examples, the relay node 605 may transmit an indication of a beam steering direction for receiving uplink signaling from the UE 115-*c* and a beam steering direction for transmitting uplink signaling to the relay node 605.

At 625, various devices may select a rank (e.g., automatically, without relying on an RI from another device). For example, at 625-*a*, the UE 115-*c* may select one or more transmission properties, such as a transmission rank for receiving downlink signaling (e.g., at 635). At 625-*b*, the relay node 605 may select transmission properties, such as rank, for relaying downlink signaling from the network entity 105-*e*, and forwarding the downlink signaling to the UE 115-*c*. At 625-*c*, the network entity 105-*e* may select transmission properties, such as rank, for transmitting downlink signaling to the UE 115-*c* via the relay node 605.

At 630, the network entity 105-*e* may transmit the downlink signaling to the relay node 605 according to the selected transmission properties. At 635, the relay node 605 may relay the downlink signaling according to the one or more transmission parameters based on the indication of the beam direction for the relay signaling. Techniques described herein may also apply to uplink signaling. For instance, the beam direction information at 615 and 620 may indicate beam steering directions for uplink signaling, rank may be selected at 625 for uplink signaling, at the relay node 605 may relay uplink signaling based on the transmission properties selected according to the beam direction information.

Figure 7:
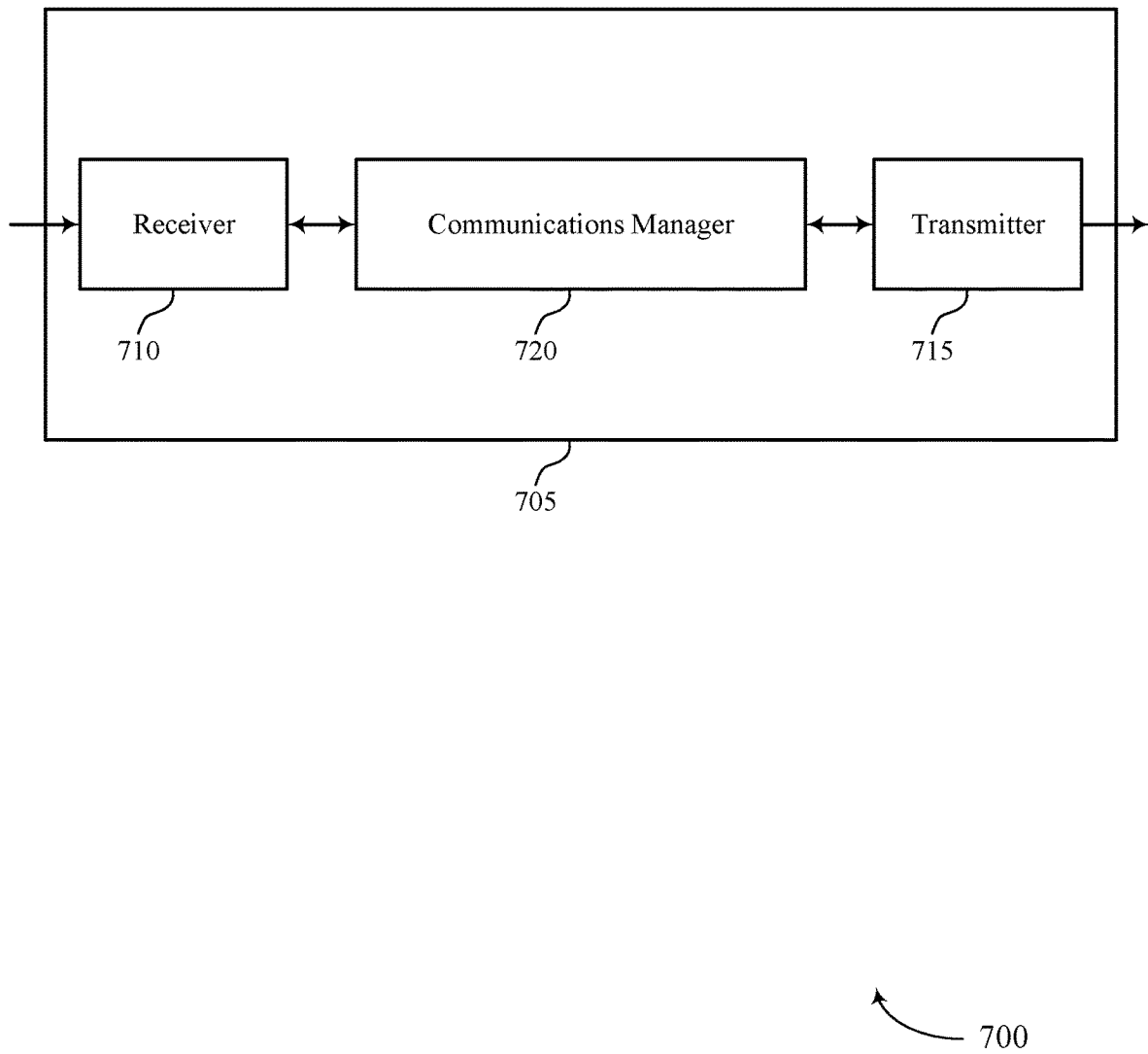
FIGS. 7 and 8 show block diagrams of devices that support indicating beam property changes across polarizations in non-co-located polarized array designs in accordance with one or more aspects of the present disclosure.

FIG. 7 shows a block diagram 700 of a device 705 that supports indicating beam property changes across polarizations in non-co-located polarized array designs in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to indicating beam property changes across polarizations in non-co-located polarized array designs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to indicating beam property changes across polarizations in non-co-located polarized array designs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of indicating beam property changes across polarizations in non-co-located polarized array designs as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a wireless device in accordance with examples as disclosed herein. For example, the communications manager 720 is capable of, configured to, or operable to support a means for receiving first downlink signaling according to a first set of transmission properties via a first set of one or more beams. The communications manager 720 is capable of, configured to, or operable to support a means for transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The communications manager 720 is capable of, configured to, or operable to support a means for receiving second downlink signaling according to a second set of transmission properties via a second set of one or more beams based on the beam report.

Additionally, or alternatively, the communications manager 720 may support wireless communications at a UE in accordance with examples as disclosed herein. For example, the communications manager 720 is capable of, configured to, or operable to support a means for receiving, from a relay node supporting relay procedures between at least the UE and a network entity, capability information indicating that the relay node supports relay signaling using a first antenna panel corresponding to a first polarization and a second antenna panel corresponding to a second polarization. The communications manager 720 is capable of, configured to, or operable to support a means for transmitting to the relay node, the network entity, or both, based on receiving the capability information, an indication of a beam direction for the relay signaling at the UE. The communications manager 720 is capable of, configured to, or operable to support a means for receiving downlink signaling via the relay node according to one or more transmission properties that are based on the indication of the beam direction for the relay signaling at the UE.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for non-co-located polarized array designs and improved signaling resulting in reduced signaling overhead, power savings, improved throughput, improved reliability of wireless communications, and improved user experience.

Figure 8:
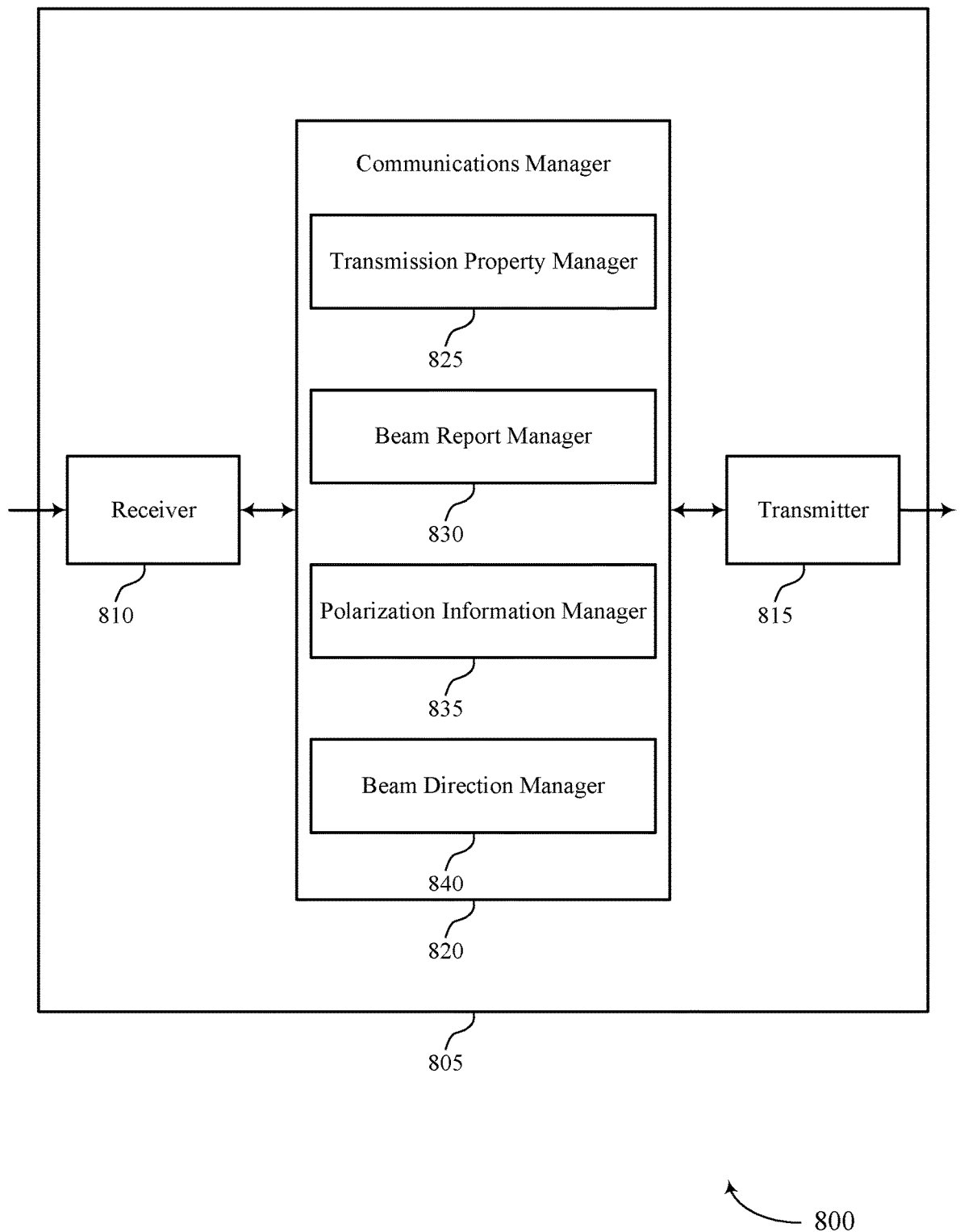

FIG. 8 shows a block diagram 800 of a device 805 that supports indicating beam property changes across polarizations in non-co-located polarized array designs in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to indicating beam property changes across polarizations in non-co-located polarized array designs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to indicating beam property changes across polarizations in non-co-located polarized array designs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of indicating beam property changes across polarizations in non-co-located polarized array designs as described herein. For example, the communications manager 820 may include a transmission property manager 825, a beam report manager 830, a polarization information manager 835, a beam direction manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a wireless device in accordance with examples as disclosed herein. The transmission property manager 825 is capable of, configured to, or operable to support a means for receiving first downlink signaling according to a first set of transmission properties via a first set of one or more beams. The beam report manager 830 is capable of, configured to, or operable to support a means for transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The transmission property manager 825 is capable of, configured to, or operable to support a means for receiving second downlink signaling according to a second set of transmission properties via a second set of one or more beams based on the beam report.

Additionally, or alternatively, the communications manager 820 may support wireless communications at a UE in accordance with examples as disclosed herein. The polarization information manager 835 is capable of, configured to, or operable to support a means for receiving, from a relay node supporting relay procedures between at least the UE and a network entity, capability information indicating that the relay node supports relay signaling using a first antenna panel corresponding to a first polarization and a second antenna panel corresponding to a second polarization. The beam direction manager 840 is capable of, configured to, or operable to support a means for transmitting to the relay node, the network entity, or both, based on receiving the capability information, an indication of a beam direction for the relay signaling at the UE. The transmission property manager 825 is capable of, configured to, or operable to support a means for receiving downlink signaling via the relay node according to one or more transmission properties that are based on the indication of the beam direction for the relay signaling at the UE.

Figure 9:
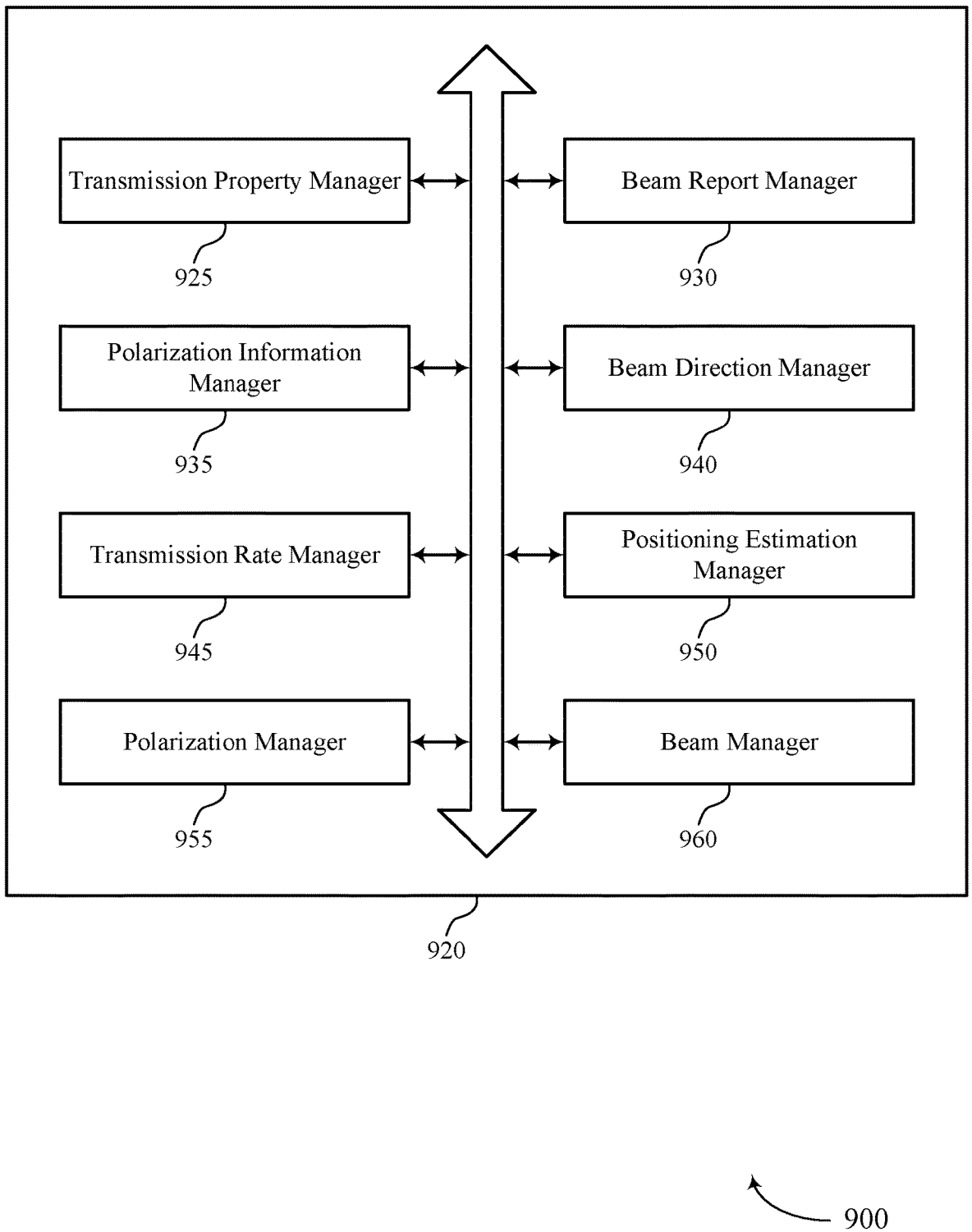
FIG. 9 shows a block diagram of a communications manager that supports indicating beam property changes across polarizations in non-co-located polarized array designs in accordance with one or more aspects of the present disclosure.

FIG. 9 shows a block diagram 900 of a communications manager 920 that supports indicating beam property changes across polarizations in non-co-located polarized array designs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of indicating beam property changes across polarizations in non-co-located polarized array designs as described herein. For example, the communications manager 920 may include a transmission property manager 925, a beam report manager 930, a polarization information manager 935, a beam direction manager 940, a transmission rate manager 945, a positioning estimation manager 950, a polarization manager 955, a beam manager 960, or any combination thereof. Each of these components, or components or subcomponents thereof (e.g., one or more processors, one or more memories), may communicate, directly or indirectly, with one another (e.g., via one or more buses).

The communications manager 920 may support wireless communications at a wireless device in accordance with examples as disclosed herein. The transmission property manager 925 is capable of, configured to, or operable to support a means for receiving first downlink signaling according to a first set of transmission properties via a first set of one or more beams. The beam report manager 930 is capable of, configured to, or operable to support a means for transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. In some examples, the transmission property manager 925 is capable of, configured to, or operable to support a means for receiving second downlink signaling according to a second set of transmission properties via a second set of one or more beams based on the beam report.

In some examples, the transmission rate manager 945 is capable of, configured to, or operable to support a means for transmitting, via the beam report, an indication of a difference between a first signal strength corresponding to the first polarization and a second signal strength corresponding to the second polarization, where the mismatch between the first transmission rate and the second transmission rate corresponds to the difference between the first signal strength and the second signal strength.

In some examples, the positioning estimation manager 950 is capable of, configured to, or operable to support a means for transmitting, via the beam report, an indication of an estimation error corresponding to the first positioning estimation accuracy, the second positioning estimation accuracy, or both, where the mismatch between the first positioning estimation accuracy and the second positioning estimation accuracy corresponds to the estimation error.

In some examples, the polarization manager 955 is capable of, configured to, or operable to support a means for transmitting, via the beam report, an indication of a preferred polarization including the first polarization or the second polarization.

In some examples, the beam manager 960 is capable of, configured to, or operable to support a means for transmitting, via the beam report, an indication that a first beam, of the first set of one or more beams, corresponding to the first polarization is not beam correspondent with a second beam, of the first set of one or more beams, corresponding to the second polarization.

In some examples, the beam manager 960 is capable of, configured to, or operable to support a means for transmitting capability information including an indication of one or more beam pairs that are not supported by the wireless device, each beam pair including a first beam corresponding to the first polarization and a second beam corresponding to the second polarization.

In some examples, the beam manager 960 is capable of, configured to, or operable to support a means for transmitting a control message including the capability information and the beam report.

In some examples, the polarization manager 955 is capable of, configured to, or operable to support a means for transmitting a first control message including the beam report. In some examples, the polarization manager 955 is capable of, configured to, or operable to support a means for transmitting a second control message including the capability information.

In some examples, to support receiving the first downlink signaling, the polarization manager 955 is capable of, configured to, or operable to support a means for receiving the first downlink signaling according to the first polarization corresponding to a first antenna panel at a network entity. In some examples, to support receiving the first downlink signaling, the polarization manager 955 is capable of, configured to, or operable to support a means for receiving the first downlink signaling according to a second antenna polarization corresponding to a second antenna panel at the network entity, where the first antenna panel and the second antenna panel are non-co-located.

In some examples, the first set of transmission properties comprises a first rank, a first transmission power, a first transmission rate, a first set of one or more beam steering angles, or any combination thereof, and the second set of transmission properties comprises a second rank, a second transmission power, a second transmission rate, a second set of one or more beam steering angles, or any combination thereof.

In some examples, the wireless device includes a relay node or a UE.

Additionally, or alternatively, the communications manager 920 may support wireless communications at a UE in accordance with examples as disclosed herein. The polarization information manager 935 is capable of, configured to, or operable to support a means for receiving, from a relay node supporting relay procedures between at least the UE and a network entity, capability information indicating that the relay node supports relay signaling using a first antenna panel corresponding to a first polarization and a second antenna panel corresponding to a second polarization. The beam direction manager 940 is capable of, configured to, or operable to support a means for transmitting to the relay node, the network entity, or both, based on receiving the capability information, an indication of a beam direction for the relay signaling at the UE. In some examples, the transmission property manager 925 is capable of, configured to, or operable to support a means for receiving downlink signaling via the relay node according to one or more transmission properties that are based on the indication of the beam direction for the relay signaling at the UE.

In some examples, the beam direction manager 940 is capable of, configured to, or operable to support a means for receiving, from the relay node, an indication of a second beam direction at the relay node, where receiving the downlink signaling is based on receiving the indication of the second beam direction.

In some examples, to support receiving the downlink signaling, the transmission property manager 925 is capable of, configured to, or operable to support a means for selecting the one or more transmission properties including a transmission rank for receiving the downlink signaling based on transmitting the indication of the beam direction.

Figure 10:
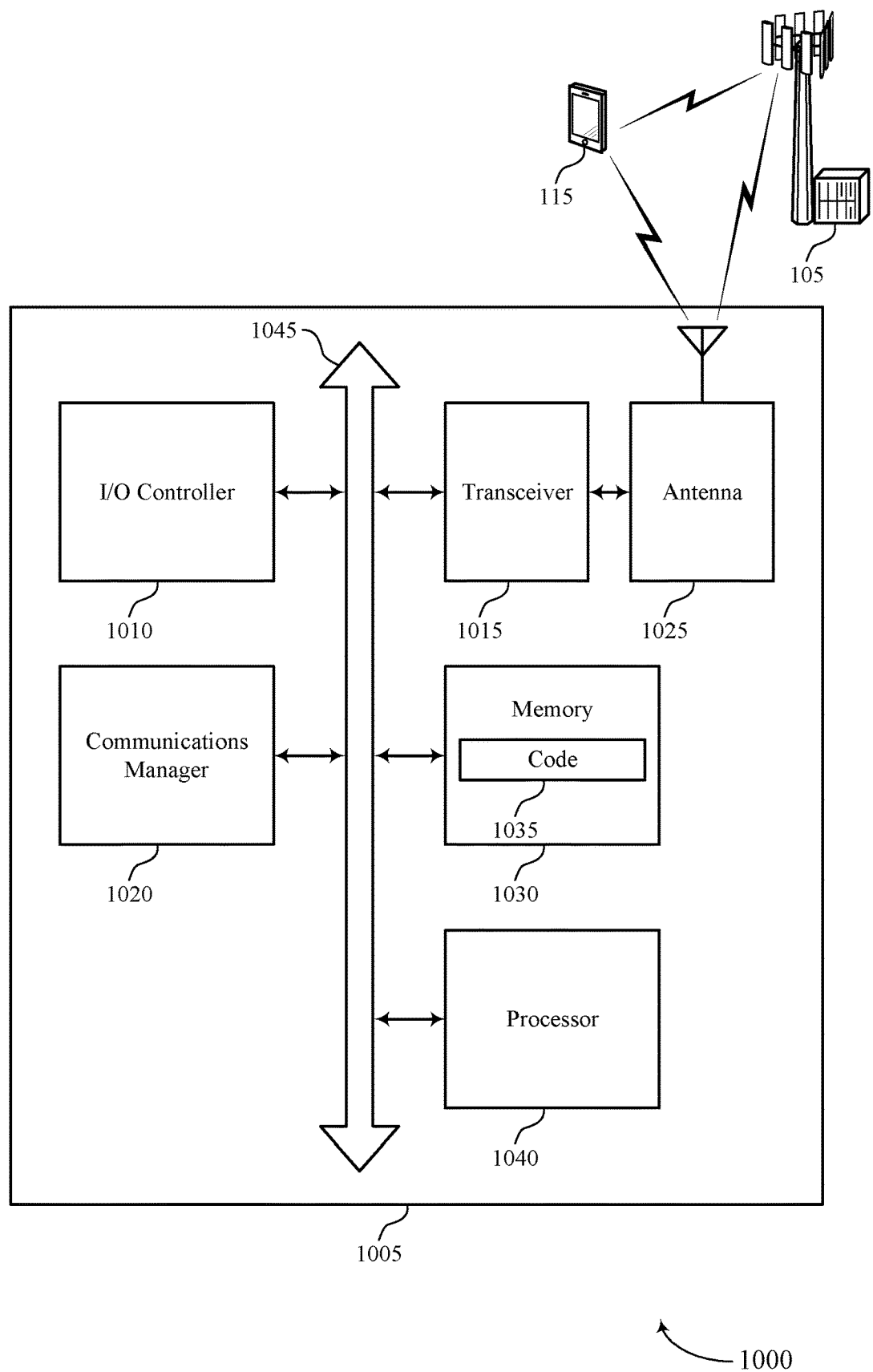
FIG. 10 shows a diagram of a system including a device that supports indicating beam property changes across polarizations in non-co-located polarized array designs in accordance with one or more aspects of the present disclosure.

FIG. 10 shows a diagram of a system 1000 including a device 1005 that supports indicating beam property changes across polarizations in non-co-located polarized array designs in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting indicating beam property changes across polarizations in non-co-located polarized array designs). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein.

The communications manager 1020 may support wireless communications at a wireless device in accordance with examples as disclosed herein. For example, the communications manager 1020 is capable of, configured to, or operable to support a means for receiving first downlink signaling according to a first set of transmission properties via a first set of one or more beams. The communications manager 1020 is capable of, configured to, or operable to support a means for transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The communications manager 1020 is capable of, configured to, or operable to support a means for receiving second downlink signaling according to a second set of transmission properties via a second set of one or more beams based on the beam report.

Additionally, or alternatively, the communications manager 1020 may support wireless communications at a UE in accordance with examples as disclosed herein. For example, the communications manager 1020 is capable of, configured to, or operable to support a means for receiving, from a relay node supporting relay procedures between at least the UE and a network entity, capability information indicating that the relay node supports relay signaling using a first antenna panel corresponding to a first polarization and a second antenna panel corresponding to a second polarization. The communications manager 1020 is capable of, configured to, or operable to support a means for transmitting to the relay node, the network entity, or both, based on receiving the capability information, an indication of a beam direction for the relay signaling at the UE. The communications manager 1020 is capable of, configured to, or operable to support a means for receiving downlink signaling via the relay node according to one or more transmission properties that are based on the indication of the beam direction for the relay signaling at the UE.

By including or configuring the communications manager 1020 in accordance with examples as described herein, the device 1005 may support techniques for non-co-located polarized array designs and improved signaling resulting in reduced signaling overhead, power savings, improved throughput, improved reliability of wireless communications, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of indicating beam property changes across polarizations in non-co-located polarized array designs as described herein, or the at least one processor 1040 and the at least one memory 1030 may be otherwise configured to, individually or collectively, perform or support such operations.

Figure 11:
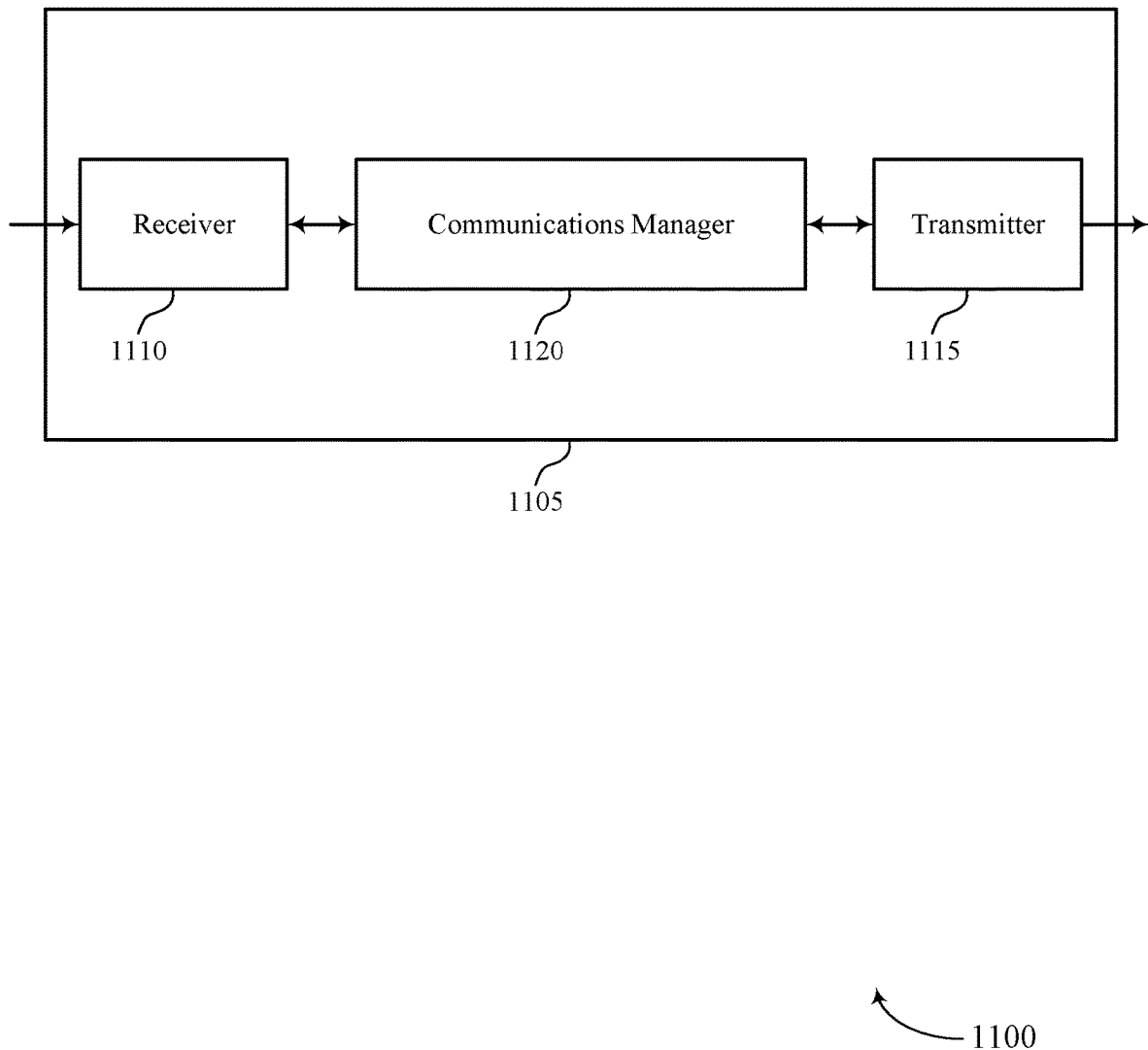
FIGS. 11 and 12 show block diagrams of devices that support indicating beam property changes across polarizations in non-co-located polarized array designs in accordance with one or more aspects of the present disclosure.

FIG. 11 shows a block diagram 1100 of a device 1105 that supports indicating beam property changes across polarizations in non-co-located polarized array designs in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of indicating beam property changes across polarizations in non-co-located polarized array designs as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling. The communications manager 1120 is capable of, configured to, or operable to support a means for receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The communications manager 1120 is capable of, configured to, or operable to support a means for transmitting, based on the beam report, second downlink signaling according to a second set of transmission properties via a second set of one or more beams and the first antenna panel and the second antenna panel.

Additionally, or alternatively, the communications manager 1120 may support wireless communications at a relay node in accordance with examples as disclosed herein. For example, the communications manager 1120 is capable of, configured to, or operable to support a means for transmitting, to a network entity, a UE, or both, capability information indicating that the relay node supports relay signaling using a first antenna panel corresponding to a first polarization and a second antenna panel corresponding to a second polarization. The communications manager 1120 is capable of, configured to, or operable to support a means for receiving, from the UE based on transmitting the capability information, an indication of a beam direction for the relay signaling at the UE. The communications manager 1120 is capable of, configured to, or operable to support a means for relaying downlink signaling according to one or more transmission properties that are based on the indication of the beam direction for the relay signaling at the UE.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for non-co-located polarized array designs and improved signaling resulting in reduced signaling overhead, power savings, improved throughput, improved reliability of wireless communications, and improved user experience.

Figure 12:
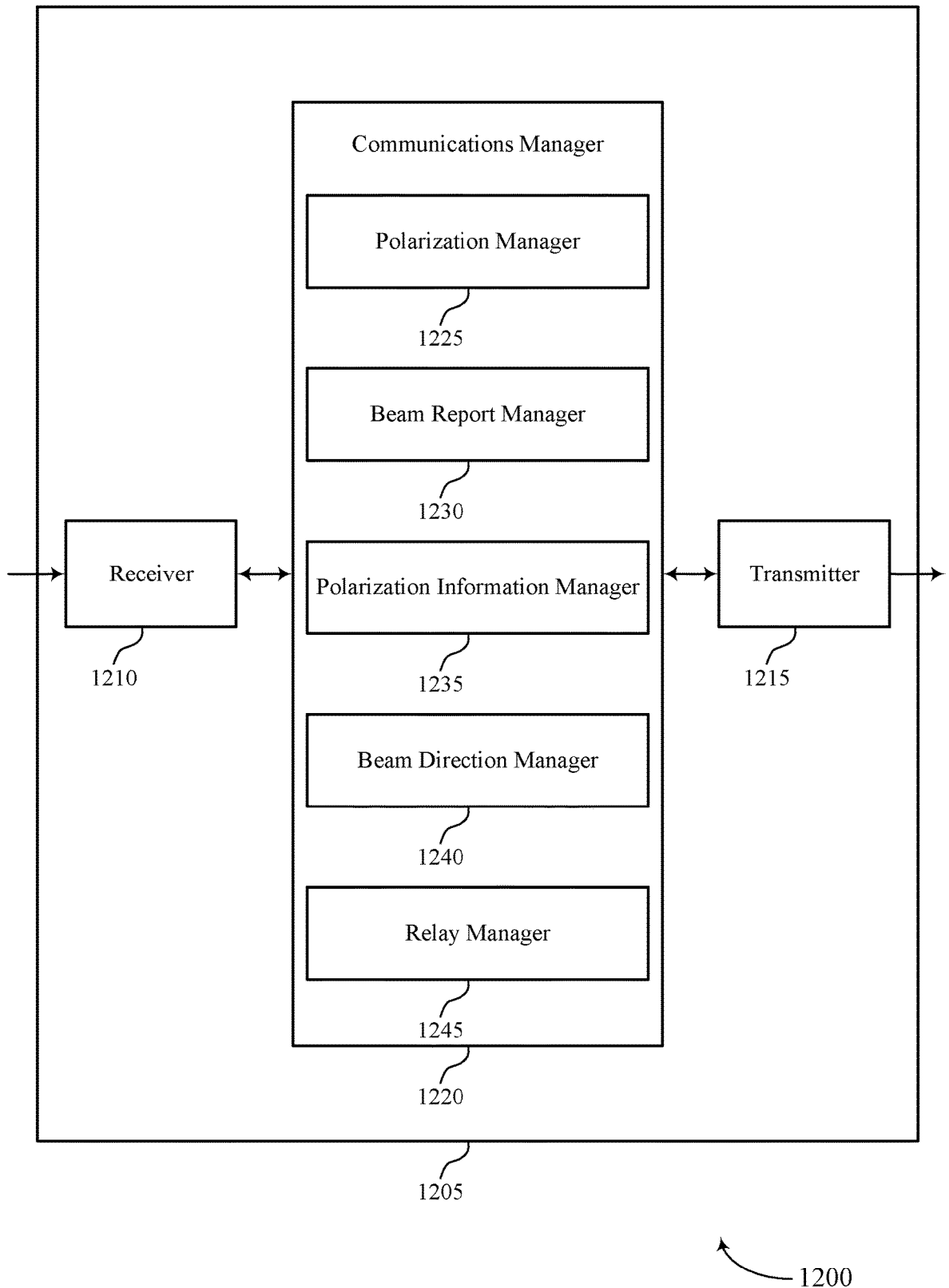

FIG. 12 shows a block diagram 1200 of a device 1205 that supports indicating beam property changes across polarizations in non-co-located polarized array designs in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of indicating beam property changes across polarizations in non-co-located polarized array designs as described herein. For example, the communications manager 1220 may include a polarization manager 1225, a beam report manager 1230, a polarization information manager 1235, a beam direction manager 1240, a relay manager 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The polarization manager 1225 is capable of, configured to, or operable to support a means for transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling. The beam report manager 1230 is capable of, configured to, or operable to support a means for receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The polarization manager 1225 is capable of, configured to, or operable to support a means for transmitting, based on the beam report, second downlink signaling according to a second set of transmission properties via a second set of one or more beams and the first antenna panel and the second antenna panel.

Additionally, or alternatively, the communications manager 1220 may support wireless communications at a relay node in accordance with examples as disclosed herein. The polarization information manager 1235 is capable of, configured to, or operable to support a means for transmitting, to a network entity, a UE, or both, capability information indicating that the relay node supports relay signaling using a first antenna panel corresponding to a first polarization and a second antenna panel corresponding to a second polarization. The beam direction manager 1240 is capable of, configured to, or operable to support a means for receiving, from the UE based on transmitting the capability information, an indication of a beam direction for the relay signaling at the UE. The relay manager 1245 is capable of, configured to, or operable to support a means for relaying downlink signaling according to one or more transmission properties that are based on the indication of the beam direction for the relay signaling at the UE.

Figure 13:
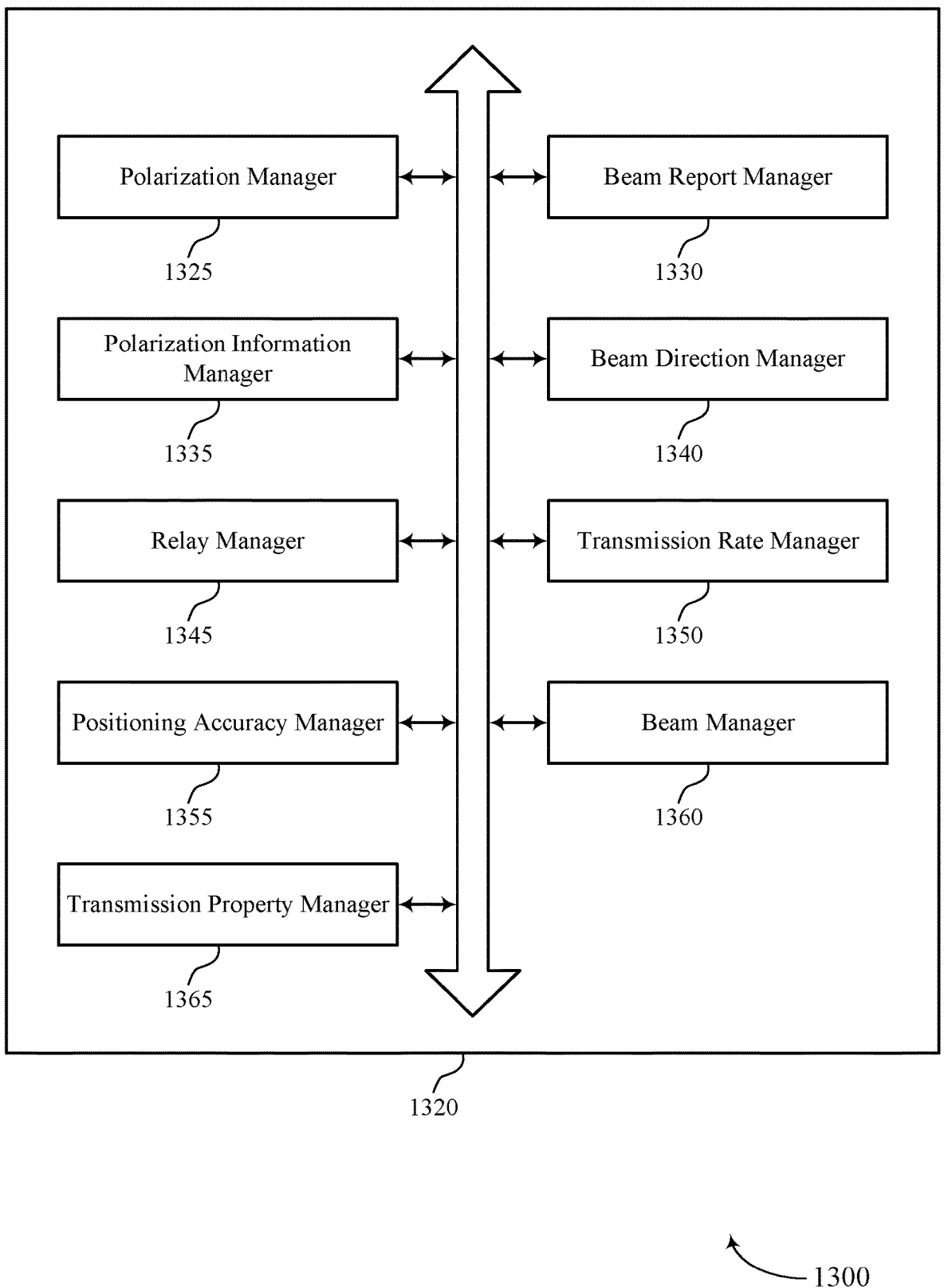
FIG. 13 shows a block diagram of a communications manager that supports indicating beam property changes across polarizations in non-co-located polarized array designs in accordance with one or more aspects of the present disclosure.

FIG. 13 shows a block diagram 1300 of a communications manager 1320 that supports indicating beam property changes across polarizations in non-co-located polarized array designs in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of indicating beam property changes across polarizations in non-co-located polarized array designs as described herein. For example, the communications manager 1320 may include a polarization manager 1325, a beam report manager 1330, a polarization information manager 1335, a beam direction manager 1340, a relay manager 1345, a transmission rate manager 1350, a positioning accuracy manager 1355, a beam manager 1360, a transmission property manager 1365, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The polarization manager 1325 is capable of, configured to, or operable to support a means for transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling. The beam report manager 1330 is capable of, configured to, or operable to support a means for receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. In some examples, the polarization manager 1325 is capable of, configured to, or operable to support a means for transmitting, based on the beam report, second downlink signaling according to a second set of transmission properties via a second set of one or more beams and the first antenna panel and the second antenna panel.

In some examples, the transmission rate manager 1350 is capable of, configured to, or operable to support a means for receiving, via the beam report, an indication of a difference between a first signal strength corresponding to the first polarization and a second signal strength corresponding to the second polarization, where the mismatch between the first transmission rate and the second transmission rate corresponds to the difference between the first signal strength and the second signal strength.

In some examples, the positioning accuracy manager 1355 is capable of, configured to, or operable to support a means for receiving, via the beam report, an indication of an estimation error corresponding to the first positioning estimation accuracy, the second positioning estimation accuracy, or both, where the mismatch between the first positioning estimation accuracy and the second positioning estimation accuracy corresponds to the estimation error.

In some examples, the polarization manager 1325 is capable of, configured to, or operable to support a means for receiving, via the beam report, an indication of a preferred polarization including the first polarization or the second polarization.

In some examples, the beam manager 1360 is capable of, configured to, or operable to support a means for receiving, via the beam report, an indication that a first beam, of the first set of one or more beams, corresponding to the first polarization is not beam correspondent with a second beam, of the first set of one or more beams, corresponding to the second polarization.

In some examples, the beam manager 1360 is capable of, configured to, or operable to support a means for receiving capability information including an indication of one or more beam pairs that are not supported by a wireless device, each beam pair including a first beam corresponding to the first polarization and a second beam corresponding to the second polarization.

In some examples, the beam report manager 1330 is capable of, configured to, or operable to support a means for transmitting a control message including the beam report and the capability information.

In some examples, the beam report manager 1330 is capable of, configured to, or operable to support a means for transmitting a first control message including the beam report. In some examples, the beam report manager 1330 is capable of, configured to, or operable to support a means for transmitting a second control message including the capability information.

In some examples, the first set of transmission properties comprises a first rank, a first transmission power, a first transmission rate, a first set of one or more beam steering angles, or any combination thereof, and the second set of transmission properties comprises a second rank, a second transmission power, a second transmission rate, a second set of one or more beam steering angles, or any combination thereof.

In some examples, the wireless device includes a relay node or a UE.

Additionally, or alternatively, the communications manager 1320 may support wireless communications at a relay node in accordance with examples as disclosed herein. The polarization information manager 1335 is capable of, configured to, or operable to support a means for transmitting, to a network entity, a UE, or both, capability information indicating that the relay node supports relay signaling using a first antenna panel corresponding to a first polarization and a second antenna panel corresponding to a second polarization. The beam direction manager 1340 is capable of, configured to, or operable to support a means for receiving, from the UE based on transmitting the capability information, an indication of a beam direction for the relay signaling at the UE. The relay manager 1345 is capable of, configured to, or operable to support a means for relaying downlink signaling according to one or more transmission properties that are based on the indication of the beam direction for the relay signaling at the UE.

In some examples, the beam direction manager 1340 is capable of, configured to, or operable to support a means for transmitting an indication of the beam direction for the relay signaling at the UE, a second beam direction for receiving the relay signaling at the relay node, or both, to a network entity, where relaying the downlink signaling is based on transmitting the indication of the beam direction, the second beam direction, or both.

In some examples, the beam direction manager 1340 is capable of, configured to, or operable to support a means for transmitting an indication of a second beam direction for receiving the relay signaling at the relay node to the UE, where relaying the downlink signaling is based on transmitting the indication of the second beam direction.

In some examples, the transmission property manager 1365 is capable of, configured to, or operable to support a means for selecting the one or more transmission properties including a transmission rank for forwarding the downlink signaling based on receiving the indication of the beam direction.

Figure 14:
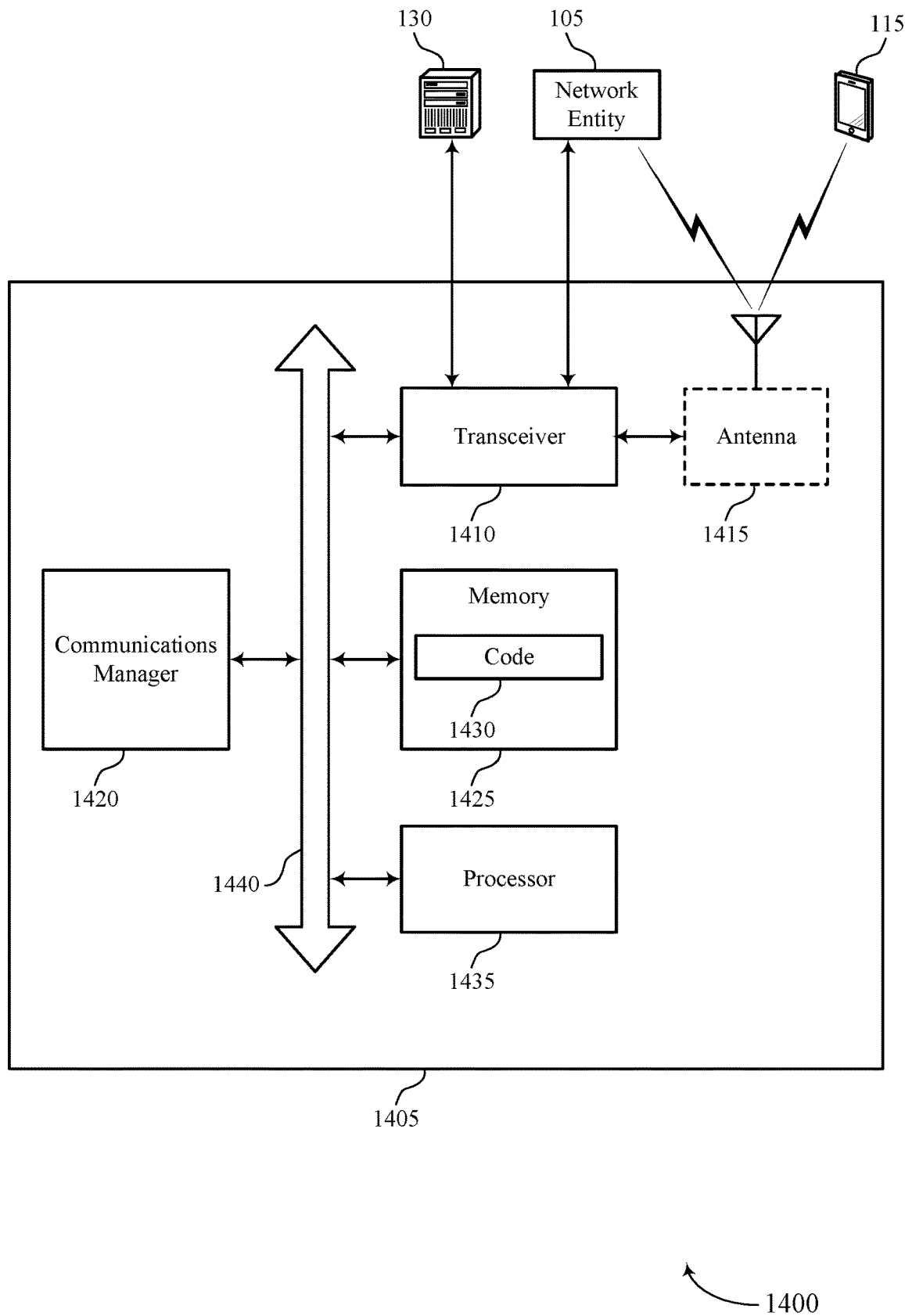
FIG. 14 shows a diagram of a system including a device that supports indicating beam property changes across polarizations in non-co-located polarized array designs in accordance with one or more aspects of the present disclosure.

FIG. 14 shows a diagram of a system 1400 including a device 1405 that supports indicating beam property changes across polarizations in non-co-located polarized array designs in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting indicating beam property changes across polarizations in non-co-located polarized array designs). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling. The communications manager 1420 is capable of, configured to, or operable to support a means for receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The communications manager 1420 is capable of, configured to, or operable to support a means for transmitting, based on the beam report, second downlink signaling according to a second set of transmission properties via a second set of one or more beams and the first antenna panel and the second antenna panel.

Additionally, or alternatively, the communications manager 1420 may support wireless communications at a relay node in accordance with examples as disclosed herein. For example, the communications manager 1420 is capable of, configured to, or operable to support a means for transmitting, to a network entity, a UE, or both, capability information indicating that the relay node supports relay signaling using a first antenna panel corresponding to a first polarization and a second antenna panel corresponding to a second polarization. The communications manager 1420 is capable of, configured to, or operable to support a means for receiving, from the UE based on transmitting the capability information, an indication of a beam direction for the relay signaling at the UE. The communications manager 1420 is capable of, configured to, or operable to support a means for relaying downlink signaling according to one or more transmission properties that are based on the indication of the beam direction for the relay signaling at the UE.

By including or configuring the communications manager 1420 in accordance with examples as described herein, the device 1405 may support techniques for non-co-located polarized array designs and improved signaling resulting in reduced signaling overhead, power savings, improved throughput, improved reliability of wireless communications, and improved user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of indicating beam property changes across polarizations in non-co-located polarized array designs as described herein, or the at least one processor 1435 and the at least one memory 1425 may be otherwise configured to, individually or collectively, perform or support such operations.

Figure 15:
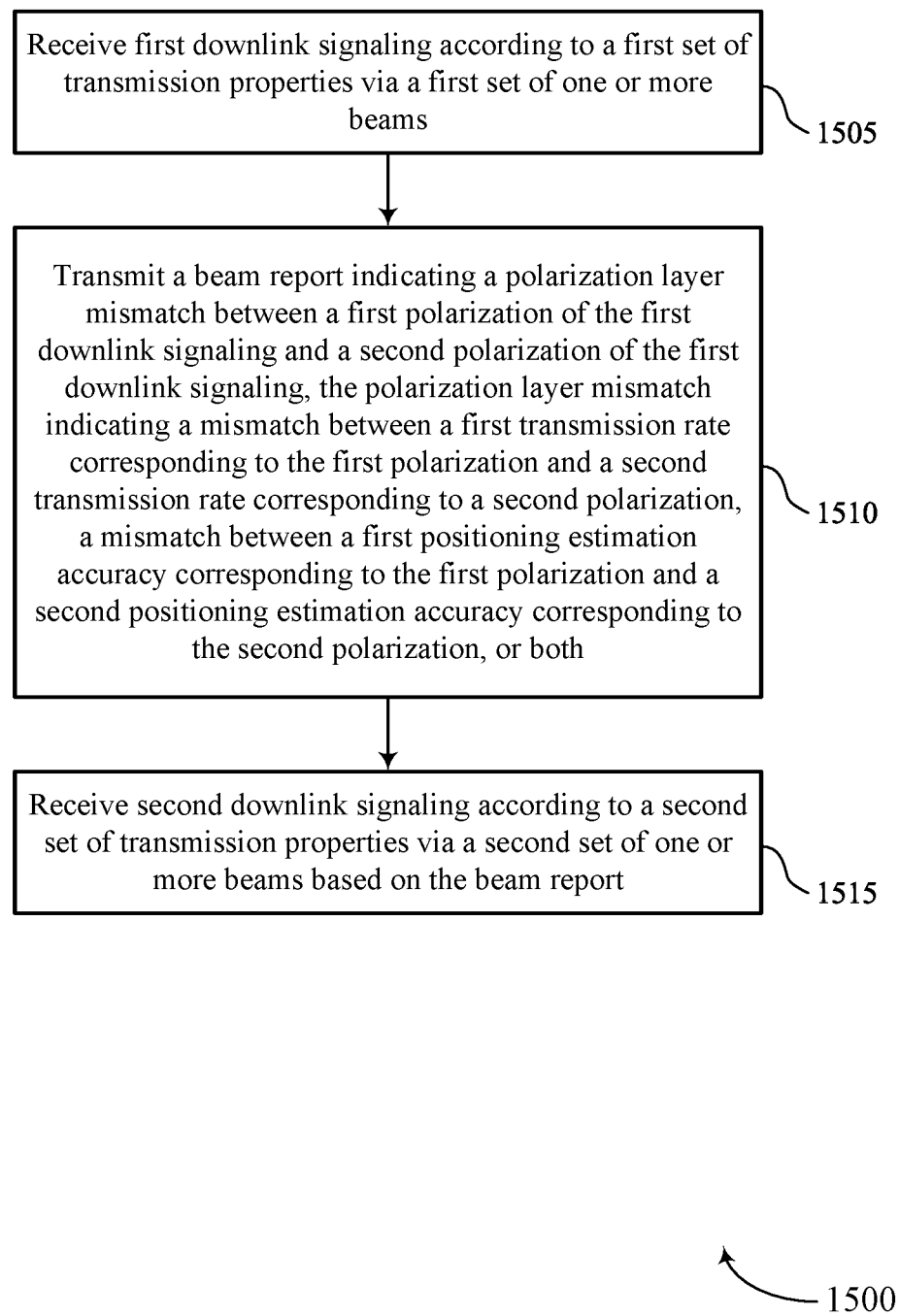
FIGS. 15 through 18 show flowcharts illustrating methods that support indicating beam property changes across polarizations in non-co-located polarized array designs in accordance with one or more aspects of the present disclosure.

FIG. 15 shows a flowchart illustrating a method 1500 that supports indicating beam property changes across polarizations in non-co-located polarized array designs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving first downlink signaling according to a first set of transmission properties via a first set of one or more beams. The operations of block 1505 may be performed in accordance with examples as disclosed herein. In some examples, aspects of the operations of 1505 may be performed by a transmission property manager 925 as described with reference to FIG. 9.

At 1510, the method may include transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The operations of block 1510 may be performed in accordance with examples as disclosed herein. In some examples, aspects of the operations of 1510 may be performed by a beam report manager 930 as described with reference to FIG. 9.

At 1515, the method may include receiving second downlink signaling according to a second set of transmission properties via a second set of one or more beams based on the beam report. The operations of block 1515 may be performed in accordance with examples as disclosed herein. In some examples, aspects of the operations of 1515 may be performed by a transmission property manager 925 as described with reference to FIG. 9.

Figure 16:
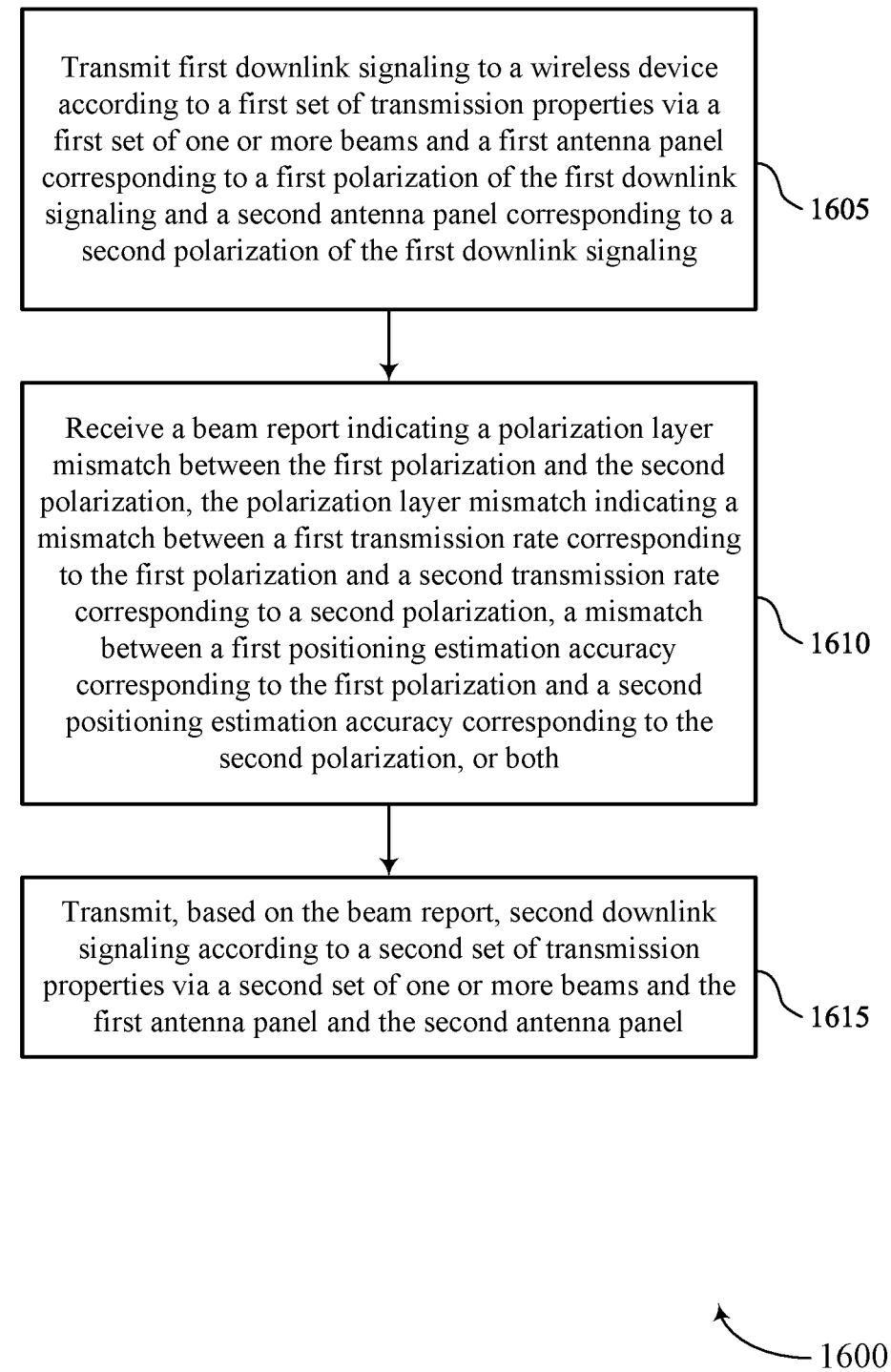

FIG. 16 shows a flowchart illustrating a method 1600 that supports indicating beam property changes across polarizations in non-co-located polarized array designs in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling. The operations of block 1605 may be performed in accordance with examples as disclosed herein. In some examples, aspects of the operations of 1605 may be performed by a polarization manager 1325 as described with reference to FIG. 13.

At 1610, the method may include receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both. The operations of block 1610 may be performed in accordance with examples as disclosed herein. In some examples, aspects of the operations of 1610 may be performed by a beam report manager 1330 as described with reference to FIG. 13.

At 1615, the method may include transmitting, based on the beam report, second downlink signaling according to a second set of transmission properties via a second set of one or more beams and the first antenna panel and the second antenna panel. The operations of block 1615 may be performed in accordance with examples as disclosed herein. In some examples, aspects of the operations of 1615 may be performed by a polarization manager 1325 as described with reference to FIG. 13.

Figure 17:
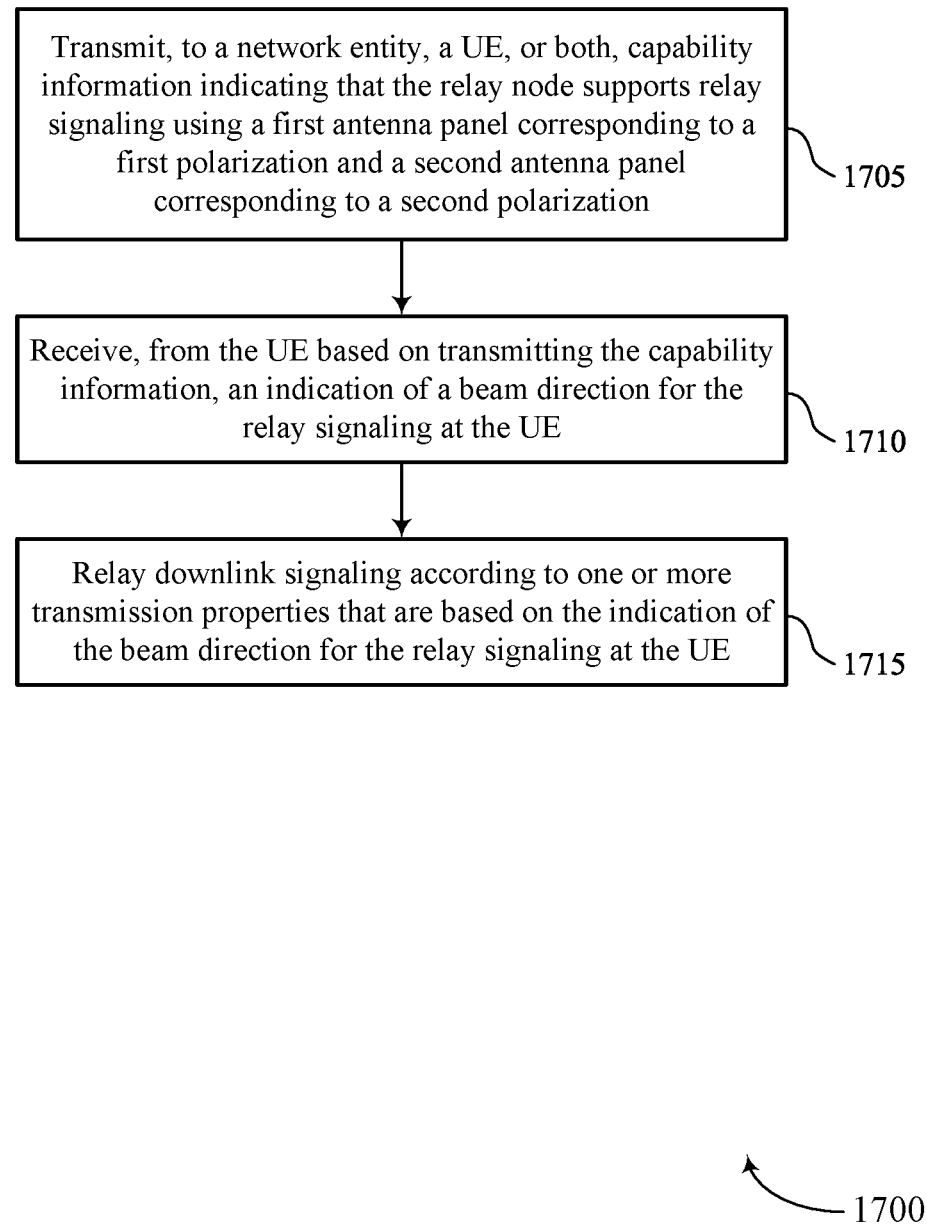

FIG. 17 shows a flowchart illustrating a method 1700 that supports indicating beam property changes across polarizations in non-co-located polarized array designs in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a network entity, a UE, or both, capability information indicating that the relay node supports relay signaling using a first antenna panel corresponding to a first polarization and a second antenna panel corresponding to a second polarization. The operations of block 1705 may be performed in accordance with examples as disclosed herein. In some examples, aspects of the operations of 1705 may be performed by a polarization information manager 1335 as described with reference to FIG. 13.

At 1710, the method may include receiving, from the UE based on transmitting the capability information, an indication of a beam direction for the relay signaling at the UE. The operations of block 1710 may be performed in accordance with examples as disclosed herein. In some examples, aspects of the operations of 1710 may be performed by a beam direction manager 1340 as described with reference to FIG. 13.

At 1715, the method may include relaying downlink signaling according to one or more transmission properties that are based on the indication of the beam direction for the relay signaling at the UE. The operations of block 1715 may be performed in accordance with examples as disclosed herein. In some examples, aspects of the operations of 1715 may be performed by a relay manager 1345 as described with reference to FIG. 13.

Figure 18:
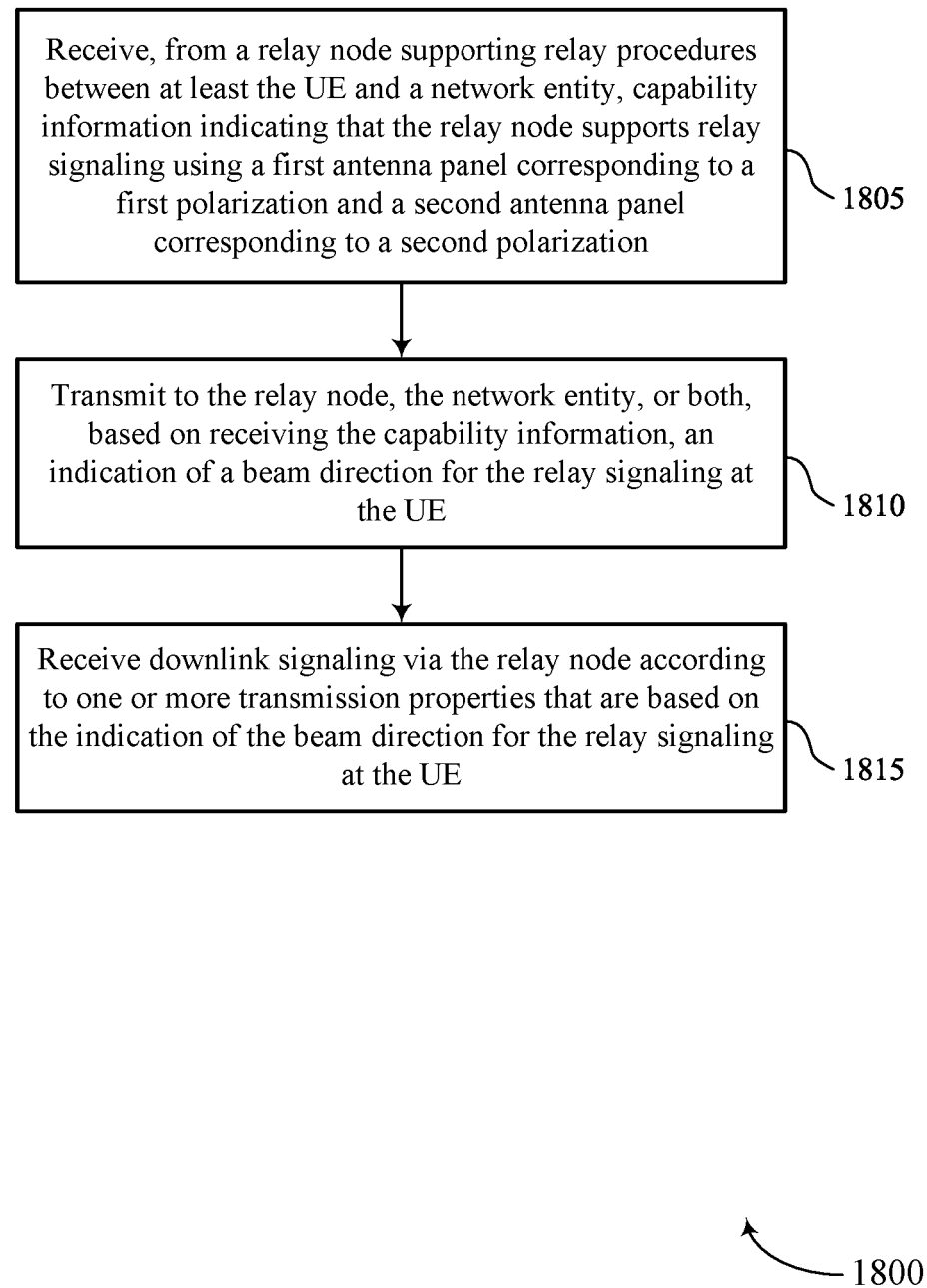

FIG. 18 shows a flowchart illustrating a method 1800 that supports indicating beam property changes across polarizations in non-co-located polarized array designs in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include receiving, from a relay node supporting relay procedures between at least the UE and a network entity, capability information indicating that the relay node supports relay signaling using a first antenna panel corresponding to a first polarization and a second antenna panel corresponding to a second polarization. The operations of block 1805 may be performed in accordance with examples as disclosed herein. In some examples, aspects of the operations of 1805 may be performed by a polarization information manager 935 as described with reference to FIG. 9.

At 1810, the method may include transmitting to the relay node, the network entity, or both, based on receiving the capability information, an indication of a beam direction for the relay signaling at the UE. The operations of block 1810 may be performed in accordance with examples as disclosed herein. In some examples, aspects of the operations of 1810 may be performed by a beam direction manager 940 as described with reference to FIG. 9.

At 1815, the method may include receiving downlink signaling via the relay node according to one or more transmission properties that are based on the indication of the beam direction for the relay signaling at the UE. The operations of block 1815 may be performed in accordance with examples as disclosed herein. In some examples, aspects of the operations of 1815 may be performed by a transmission property manager 925 as described with reference to FIG. 9.

The following provides an overview of aspects of the present disclosure:

Aspect 1: A method for wireless communications at a wireless device, comprising: receiving first downlink signaling according to a first set of transmission properties via a first set of one or more beams; transmitting a beam report indicating a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both; and receiving second downlink signaling according to a second set of transmission properties via a second set of one or more beams based at least in part on the beam report.

Aspect 2: The method of aspect 1, further comprising: transmitting, via the beam report, an indication of a difference between a first signal strength corresponding to the first polarization and a second signal strength corresponding to the second polarization, wherein the mismatch between the first transmission rate and the second transmission rate corresponds to the difference between the first signal strength and the second signal strength.

Aspect 3: The method of any of aspects 1 through 2, further comprising: transmitting, via the beam report, an indication of an estimation error corresponding to the first positioning estimation accuracy, the second positioning estimation accuracy, or both, wherein the mismatch between the first positioning estimation accuracy and the second positioning estimation accuracy corresponds to the estimation error.

Aspect 4: The method of any of aspects 1 through 3, further comprising: transmitting, via the beam report, an indication of a preferred polarization comprising the first polarization or the second polarization.

Aspect 5: The method of any of aspects 1 through 4, further comprising: transmitting, via the beam report, an indication that a first beam, of the first set of one or more beams, corresponding to the first polarization is not beam correspondent with a second beam, of the first set of one or more beams, corresponding to the second polarization.

Aspect 6: The method of any of aspects 1 through 5, further comprising: transmitting capability information comprising an indication of one or more beam pairs that are not supported by the wireless device, each beam pair comprising a first beam corresponding to the first polarization and a second beam corresponding to the second polarization.

Aspect 7: The method of aspect 6, further comprising: transmitting a control message comprising the capability information and the beam report.

Aspect 8: The method of any of aspects 6 through 7, further comprising: transmitting a first control message comprising the beam report; and transmitting a second control message comprising the capability information.

Aspect 9: The method of any of aspects 1 through 8, wherein receiving the first downlink signaling comprises: receiving the first downlink signaling according to the first polarization corresponding to a first antenna panel at a network entity; and receiving the first downlink signaling according to a second antenna polarization corresponding to a second antenna panel at the network entity, wherein the first antenna panel and the second antenna panel are non-co-located.

Aspect 10: The method of any of aspects 1 through 9, wherein the first set of transmission properties comprises a first rank, a first transmission power, a first transmission rate, a first set of one or more beam steering angles, or any combination thereof, and the second set of transmission properties comprises a second rank, a second transmission power, a second transmission rate, a second set of one or more beam steering angles, or any combination thereof.

Aspect 11: The method of any of aspects 1 through 10, wherein the wireless device comprises a relay node or a UE.

Aspect 12: A method for wireless communications at a network entity, comprising: transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling; receiving a beam report indicating a polarization layer mismatch between the first polarization and the second polarization, the polarization layer mismatch indicating a mismatch between a first transmission rate corresponding to the first polarization and a second transmission rate corresponding to a second polarization, a mismatch between a first positioning estimation accuracy corresponding to the first polarization and a second positioning estimation accuracy corresponding to the second polarization, or both; and transmitting, based at least in part on the beam report, second downlink signaling according to a second set of transmission properties via a second set of one or more beams and the first antenna panel and the second antenna panel.

Aspect 13: The method of aspect 12, further comprising: receiving, via the beam report, an indication of a difference between a first signal strength corresponding to the first polarization and a second signal strength corresponding to the second polarization, wherein the mismatch between the first transmission rate and the second transmission rate corresponds to the difference between the first signal strength and the second signal strength.

Aspect 14: The method of any of aspects 12 through 13, further comprising: receiving, via the beam report, an indication of an estimation error corresponding to the first positioning estimation accuracy, the second positioning estimation accuracy, or both, wherein the mismatch between the first positioning estimation accuracy and the second positioning estimation accuracy corresponds to the estimation error.

Aspect 15: The method of any of aspects 12 through 14, further comprising: receiving, via the beam report, an indication of a preferred polarization comprising the first polarization or the second polarization.

Aspect 16: The method of any of aspects 12 through 15, further comprising: receiving, via the beam report, an indication that a first beam, of the first set of one or more beams, corresponding to the first polarization is not beam correspondent with a second beam, of the first set of one or more beams, corresponding to the second polarization.

Aspect 17: The method of any of aspects 12 through 16, further comprising: receiving capability information comprising an indication of one or more beam pairs that are not supported by a wireless device, each beam pair comprising a first beam corresponding to the first polarization and a second beam corresponding to the second polarization.

Aspect 18: The method of aspect 17, further comprising: transmitting a control message comprising the beam report and the capability information.

Aspect 19: The method of any of aspects 17 through 18, further comprising: transmitting a first control message comprising the beam report; and transmitting a second control message comprising the capability information.

Aspect 20: The method of any of aspects 12 through 19, wherein the first set of transmission properties comprises a first rank, a first transmission power, a first transmission rate, a first set of one or more beam steering angles, or any combination thereof, and the second set of transmission properties comprises a second rank, a second transmission power, a second transmission rate, a second set of one or more beam steering angles, or any combination thereof.

Aspect 21: The method of any of aspects 12 through 20, wherein the wireless device comprises a relay node or a UE.

Aspect 22: A method for wireless communications at a relay node, comprising: transmitting, to a network entity, a UE, or both, capability information indicating that the relay node supports relay signaling using a first antenna panel corresponding to a first polarization and a second antenna panel corresponding to a second polarization; receiving, from the UE based at least in part on transmitting the capability information, an indication of a beam direction for the relay signaling at the UE; and relaying downlink signaling according to one or more transmission properties that are based at least in part on the indication of the beam direction for the relay signaling at the UE.

Aspect 23: The method of aspect 22, further comprising: transmitting an indication of the beam direction for the relay signaling at the UE, a second beam direction for receiving the relay signaling at the relay node, or both, to a network entity, wherein relaying the downlink signaling is based at least in part on transmitting the indication of the beam direction, the second beam direction, or both.

Aspect 24: The method of any of aspects 22 through 23, further comprising: transmitting an indication of a second beam direction for receiving the relay signaling at the relay node to the UE, wherein relaying the downlink signaling is based at least in part on transmitting the indication of the second beam direction.

Aspect 25: The method of any of aspects 22 through 24, further comprising: selecting the one or more transmission properties comprising a transmission rank for forwarding the downlink signaling based at least in part on receiving the indication of the beam direction.

Aspect 26: A method for wireless communications at a UE, comprising: receiving, from a relay node supporting relay procedures between at least the UE and a network entity, capability information indicating that the relay node supports relay signaling using a first antenna panel corresponding to a first polarization and a second antenna panel corresponding to a second polarization; transmitting to the relay node, the network entity, or both, based at least in part on receiving the capability information, an indication of a beam direction for the relay signaling at the UE; and receiving downlink signaling via the relay node according to one or more transmission properties that are based at least in part on the indication of the beam direction for the relay signaling at the UE.

Aspect 27: The method of aspect 26, further comprising: receiving, from the relay node, an indication of a second beam direction at the relay node, wherein receiving the downlink signaling is based at least in part on receiving the indication of the second beam direction.

Aspect 28: The method of any of aspects 26 through 27, wherein receiving the downlink signaling comprises: selecting the one or more transmission properties comprising a transmission rank for receiving the downlink signaling based at least in part on transmitting the indication of the beam direction.

Aspect 29: A wireless device for wireless communications, comprising one or more memories storing processor-executable code, and one or more processors coupled with the one or more memories and individually or collectively operable to execute the code to cause the wireless device to perform a method of any of aspects 1 through 11.

Aspect 30: A wireless device for wireless communications, comprising at least one means for performing a method of any of aspects 1 through 11.

Aspect 31: A non-transitory computer-readable medium storing code for wireless communications, the code comprising instructions executable by a processor to perform a method of any of aspects 1 through 11.

Aspect 32: A network entity for wireless communications, comprising one or more memories storing processor-executable code, and one or more processors coupled with the one or more memories and individually or collectively operable to execute the code to cause the network entity to perform a method of any of aspects 12 through 21.

Aspect 33: A network entity for wireless communications, comprising at least one means for performing a method of any of aspects 12 through 21.

Aspect 34: A non-transitory computer-readable medium storing code for wireless communications, the code comprising instructions executable by a processor to perform a method of any of aspects 12 through 21.

Aspect 35: A relay node for wireless communications, comprising one or more memories storing processor-executable code, and one or more processors coupled with the one or more memories and individually or collectively operable to execute the code to cause the relay node to perform a method of any of aspects 22 through 25.

Aspect 36: A relay node for wireless communications, comprising at least one means for performing a method of any of aspects 22 through 25.

Aspect 37: A non-transitory computer-readable medium storing code for wireless communications, the code comprising instructions executable by a processor to perform a method of any of aspects 22 through 25.

Aspect 38: A UE for wireless communications, comprising one or more memories storing processor-executable code, and one or more processors coupled with the one or more memories and individually or collectively operable to execute the code to cause the UE to perform a method of any of aspects 26 through 28.

Aspect 39: A UE for wireless communications, comprising at least one means for performing a method of any of aspects 26 through 28.

Aspect 40: A non-transitory computer-readable medium storing code for wireless communications, the code comprising instructions executable by a processor to perform a method of any of aspects 26 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:
   one or more memories storing processor-executable code; and
   one or more processors coupled with the one or more memories and individually or collectively operable to execute the code to cause the apparatus to:
   receive first downlink signaling according to a first set of transmission properties via a first set of one or more beams;
   transmit a beam report comprising an indication of a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to the second polarization, and a mismatch between a first positioning estimation accuracy corresponding to the first polarization and a second positioning estimation accuracy corresponding to the second polarization, wherein the beam report further comprises an indication of an estimation error corresponding to the first positioning estimation accuracy, the second positioning estimation accuracy, or both, wherein the mismatch between the first positioning estimation accuracy and the second positioning estimation accuracy corresponds to the estimation error; and
   receive second downlink signaling according to a second set of transmission properties via a second set of one or more beams based at least in part on the beam report.

2. The apparatus of claim 1, wherein the one or more processors are individually or collectively operable to execute the code to cause the apparatus to:
   transmit, via the beam report, an indication of a difference between a first signal strength corresponding to the first polarization and a second signal strength corresponding to the second polarization, wherein the mismatch between the first transmission rate and the second transmission rate corresponds to the difference between the first signal strength and the second signal strength.

3. The apparatus of claim 1, wherein the one or more processors are individually or collectively operable to execute the code to cause the apparatus to:
   transmit, via the beam report, an indication of a preferred polarization comprising the first polarization or the second polarization.

4. The apparatus of claim 1, wherein the one or more processors are individually or collectively operable to execute the code to cause the apparatus to:
   transmit, via the beam report, an indication that a first beam, of the first set of one or more beams, corresponding to the first polarization is not beam correspondent with a second beam, of the first set of one or more beams, corresponding to the second polarization.

5. The apparatus of claim 1, wherein the one or more processors are individually or collectively operable to execute the code to cause the apparatus to:
   transmit capability information comprising an indication of one or more beam pairs that are not supported by the wireless device, each beam pair comprising a first beam corresponding to the first polarization and a second beam corresponding to the second polarization.

6. The apparatus of claim 5, wherein the one or more processors are individually or collectively operable to execute the code to cause the apparatus to:
   transmit a control message comprising the capability information and the beam report.

7. The apparatus of claim 5, wherein the one or more processors are individually or collectively operable to execute the code to cause the apparatus to:

transmit a first control message comprising the beam report; and transmit a second control message comprising the capability information.

8. The apparatus of claim 1, wherein, to receive the first downlink signaling, the one or more processors are individually or collectively operable to execute the code to cause the apparatus to:

receive the first downlink signaling according to the first polarization corresponding to a first antenna panel at a network entity; and receive the first downlink signaling according to a second antenna polarization corresponding to a second antenna panel at the network entity, wherein the first antenna panel and the second antenna panel are non-co-located.

9. The apparatus of claim 1, wherein the first set of transmission properties comprises a first rank, a first transmission power, the first transmission rate, a first set of one or more beam steering angles, or any combination thereof, and the second set of transmission properties comprises a second rank, a second transmission power, the second transmission rate, a second set of one or more beam steering angles, or any combination thereof.

10. The apparatus of claim 1, wherein the wireless device comprises a relay node or a user equipment (UE).

11. An apparatus for wireless communications at a network entity, comprising:

one or more memories storing processor-executable code; and one or more processors coupled with the one or more memories and individually or collectively operable to execute the code to cause the apparatus to:

transmit first downlink signaling to a wireless device according to a first set of transmission properties via a first set of one or more beams and a first antenna panel corresponding to a first polarization of the first downlink signaling and a second antenna panel corresponding to a second polarization of the first downlink signaling;

receive a beam report comprising an indication of a polarization layer mismatch between the first polarization and the second polarization, the polarization layer mismatch indicating a mismatch between a first transmission rate corresponding to the first polarization and a second transmission rate corresponding to the second polarization, and a mismatch between a first positioning estimation accuracy corresponding to the first polarization and a second positioning estimation accuracy corresponding to the second polarization, wherein the beam report further comprises an indication of an estimation error corresponding to the first positioning estimation accuracy, the second positioning estimation accuracy, or both, wherein the mismatch between the first positioning estimation accuracy and the second positioning estimation accuracy corresponds to the estimation error; and transmit, based at least in part on the beam report, second downlink signaling according to a second set of transmission properties via a second set of one or more beams and the first antenna panel and the second antenna panel.

12. The apparatus of claim 11, wherein the one or more processors are individually or collectively operable to execute the code to cause the apparatus to:

receive, via the beam report, an indication of a difference between a first signal strength corresponding to the first polarization and a second signal strength corresponding to the second polarization, wherein the mismatch between the first transmission rate and the second transmission rate corresponds to the difference between the first signal strength and the second signal strength.

13. The apparatus of claim 11, wherein the one or more processors are individually or collectively operable to execute the code to cause the apparatus to:

receive, via the beam report, an indication of a preferred polarization comprising the first polarization or the second polarization.

14. The apparatus of claim 11, wherein the one or more processors are individually or collectively operable to execute the code to cause the apparatus to:

receive, via the beam report, an indication that a first beam, of the first set of one or more beams, corresponding to the first polarization is not beam correspondent with a second beam, of the first set of one or more beams, corresponding to the second polarization.

15. The apparatus of claim 11, wherein the one or more processors are individually or collectively operable to execute the code to cause the apparatus to:

receive capability information comprising an indication of one or more beam pairs that are not supported by the wireless device, each beam pair comprising a first beam corresponding to the first polarization and a second beam corresponding to the second polarization.

16. The apparatus of claim 15, wherein the one or more processors are individually or collectively operable to execute the code to cause the apparatus to:

transmit a control message comprising the beam report and the capability information.

17. The apparatus of claim 15, wherein the one or more processors are individually or collectively operable to execute the code to cause the apparatus to:

transmit a first control message comprising the beam report; and transmit a second control message comprising the capability information.

18. The apparatus of claim 11, wherein the first set of transmission properties comprises a first rank, a first transmission power, the first transmission rate, a first set of one or more beam steering angles, or any combination thereof, and the second set of transmission properties comprises a second rank, a second transmission power, the second transmission rate, a second set of one or more beam steering angles, or any combination thereof.

19. The apparatus of claim 11, wherein the wireless device comprises a relay node or a user equipment (UE).

20. A method for wireless communications at a wireless device, comprising:

receiving first downlink signaling according to a first set of transmission properties via a first set of one or more beams;

transmitting a beam report comprising an indication of a polarization layer mismatch between a first polarization of the first downlink signaling and a second polarization of the first downlink signaling, the polarization layer mismatch indicating a mismatch between a first transmission rate corresponding to the first polarization and a second transmission rate corresponding to the second polarization, and a mismatch between a first positioning estimation accuracy corresponding to the first polarization and a second positioning estimation accuracy corresponding to the second polarization, wherein the beam report further comprises an indication of an estimation error corresponding to the first positioning estimation accuracy, the second positioning estimation accuracy, or both, wherein the mismatch between the first positioning estimation accuracy and the second positioning estimation accuracy corresponds to the estimation error; and receiving second downlink signaling according to a second set of transmission properties via a second set of one or more beams based at least in part on the beam report.

21. The method of claim 20, further comprising:
transmitting, via the beam report, an indication of a difference between a first signal strength corresponding to the first polarization and a second signal strength corresponding to the second polarization, wherein the mismatch between the first transmission rate and the second transmission rate corresponds to the difference between the first signal strength and the second signal strength.

22. The method of claim 20, further comprising:
transmitting, via the beam report, an indication of a preferred polarization comprising the first polarization or the second polarization.

23. The method of claim 20, further comprising:
transmitting, via the beam report, an indication that a first beam, of the first set of one or more beams, corresponding to the first polarization is not beam correspondent with a second beam, of the first set of one or more beams, corresponding to the second polarization.

24. The method of claim 20, further comprising:
transmitting capability information comprising an indication of one or more beam pairs that are not supported by the wireless device, each beam pair comprising a first beam corresponding to the first polarization and a second beam corresponding to the second polarization.

25. A method for wireless communications at a network entity, comprising:

transmitting first downlink signaling to a wireless device according to a first set of transmission properties via a first set of one or more beams and a first antenna panel corresponding to a first polarization of the first downlink signaling and a second antenna panel corresponding to a second polarization of the first downlink signaling;

receiving a beam report comprising an indication of a polarization layer mismatch between the first polarization and the second polarization, the polarization layer mismatch indicating a mismatch between a first transmission rate corresponding to the first polarization and a second transmission rate corresponding to the second polarization, and a mismatch between a first positioning estimation accuracy corresponding to the first polarization and a second positioning estimation accuracy corresponding to the second polarization, wherein the beam report further comprises an indication of an estimation error corresponding to the first positioning estimation accuracy, the second positioning estimation accuracy, or both, wherein the mismatch between the first positioning estimation accuracy and the second positioning estimation accuracy corresponds to the estimation error; and transmitting, based at least in part on the beam report, second downlink signaling according to a second set of transmission properties via a second set of one or more beams and the first antenna panel and the second antenna panel.

* * * * *